(12) United States Patent
Date et al.

(10) Patent No.: US 7,466,685 B2
(45) Date of Patent: Dec. 16, 2008

(54) APPARATUS FOR CONTROLLING DATA TRANSMISSION TIMING RESPONSIVELY TO A CALCULATED COLLISION RATIO

(75) Inventors: Masaaki Date, Osaka (JP); Kosuke Sekiyama, Fukui (JP); Yuki Kubo, Osaka (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 383 days.

(21) Appl. No.: 11/217,376

(22) Filed: Sep. 2, 2005

(65) Prior Publication Data

US 2006/0050826 A1    Mar. 9, 2006

(30) Foreign Application Priority Data

Sep. 3, 2004  (JP) ............................. 2004-257562
Sep. 3, 2004  (JP) ............................. 2004-257567

(51) Int. Cl.
*H04J 3/06* (2006.01)

(52) U.S. Cl. ...................... 370/350; 370/321; 370/322; 370/329; 370/336; 370/337; 370/347; 370/445; 370/447; 370/448; 455/450; 455/451; 455/452.1; 455/452.2

(58) Field of Classification Search ................. None
See application file for complete search history.

(56) References Cited

U.S. PATENT DOCUMENTS 6,721,331 B1* 4/2004 Agrawal et al. ............. 370/448
2005/0122989 A1* 6/2005 Ginzburg et al. ............ 370/445

OTHER PUBLICATIONS

Y. Matsushita, et al. "Wireless LAN Architecture" pp. 47, 53-59 and 69, Kyoritsu Shuppan Co., Ltd., Tokyo, Japan, 1996.

* cited by examiner

*Primary Examiner*—Stephen M D'Agosta
(74) *Attorney, Agent, or Firm*—Venable LLP; Michael A. Sartori; Catherine M. Voorhees

(57) ABSTRACT

Communication control apparatus provided in nodes forming a telecommunications network includes a transmission timing calculator responsive to the state of the phase of the own node to determine a timing at which the node transmits data. The calculator is responsive to a state variable signal transmitted by a neighboring node and reflecting the phase of the neighboring node to change the state of the phase of the own node in accordance with a time development rule. The calculator monitors a phase difference of the own node against the neighboring node to calculate, based on the difference, the ratio of collision on data transmission timing between the own and neighboring nodes. The stress value corresponding to the collision ratio is stored time-serially. A stress response function value is generated such that the stored stress value causes the time development rule to shift the phase with its value made at random.

12 Claims, 10 Drawing Sheets

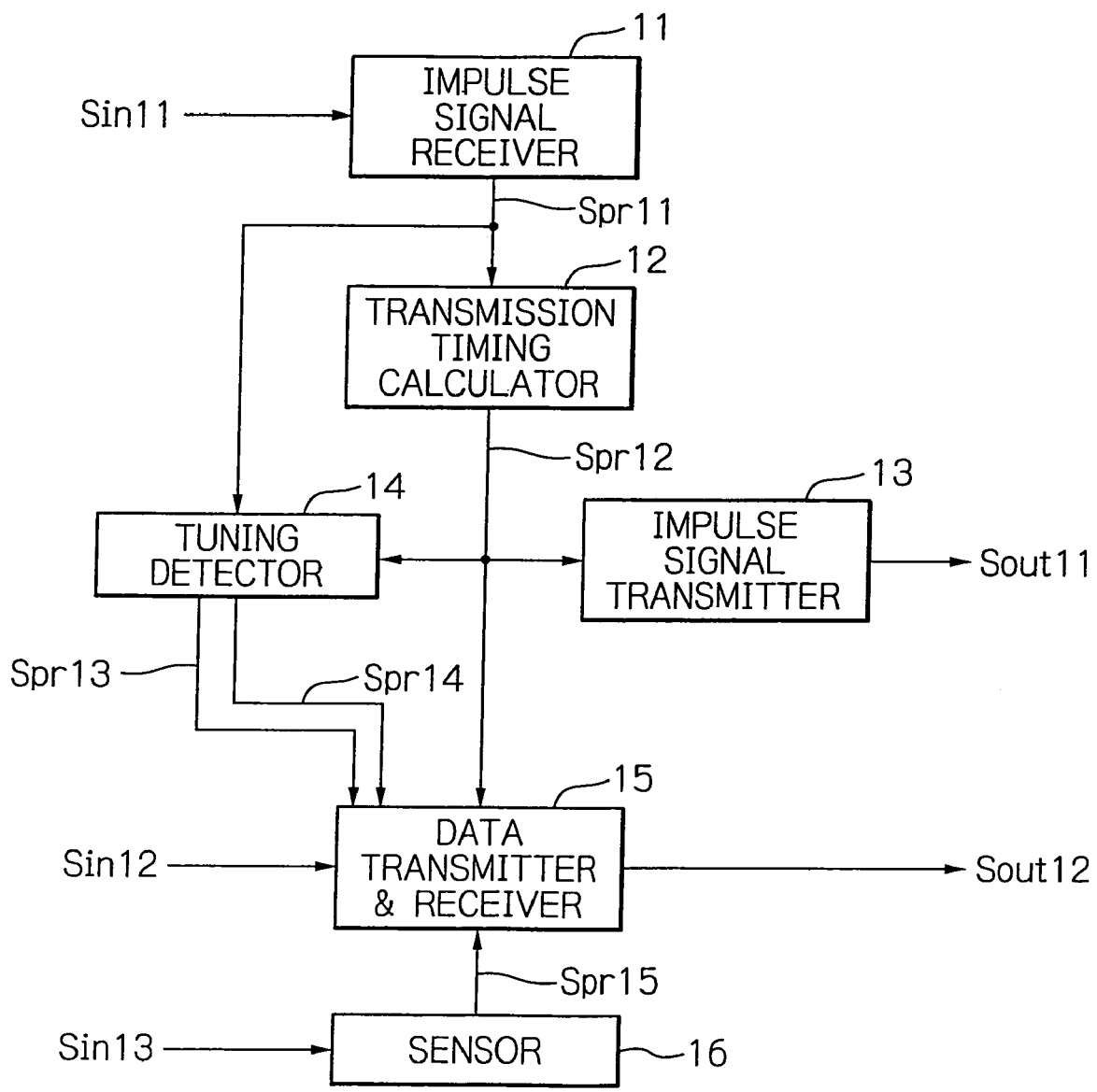

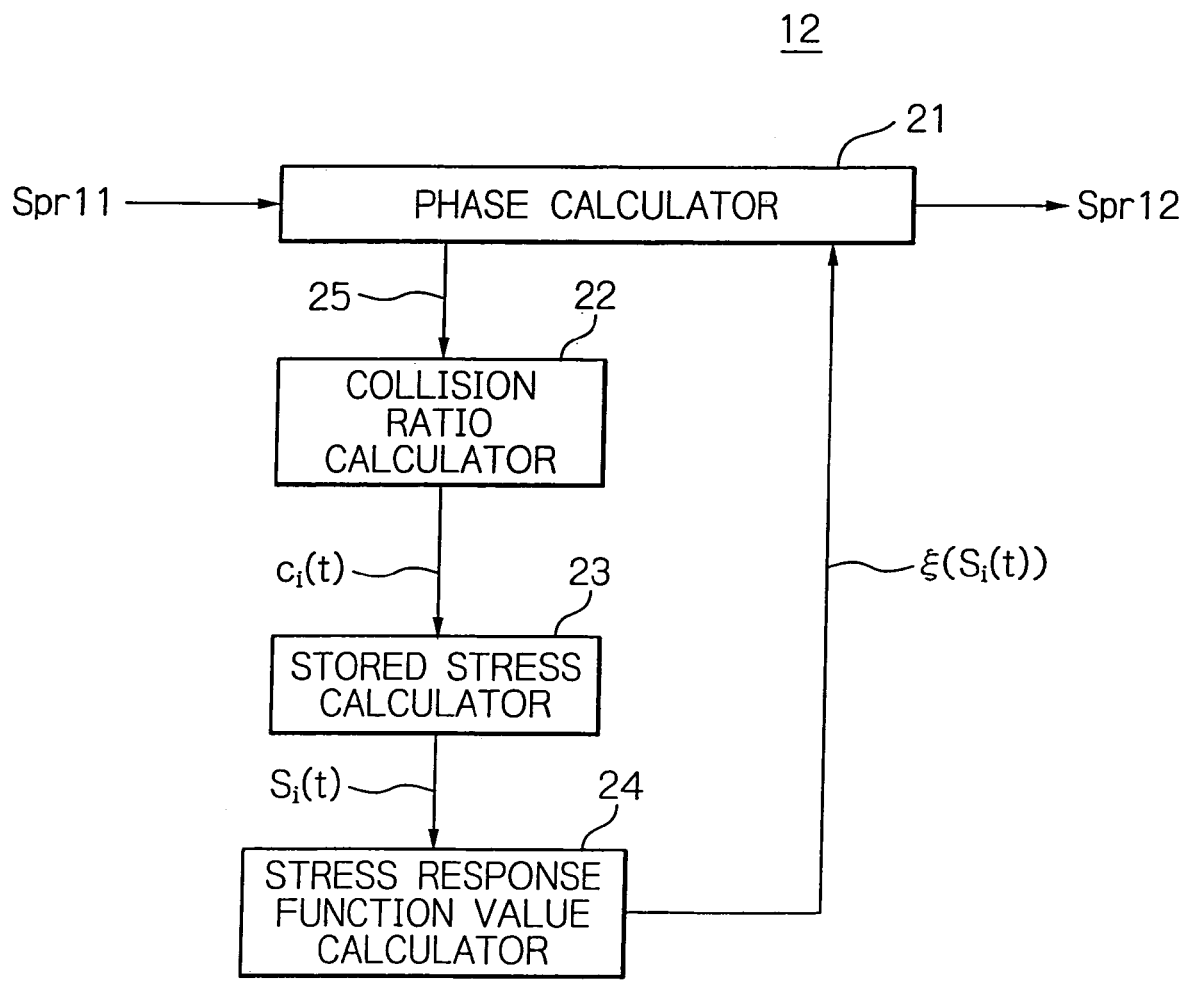

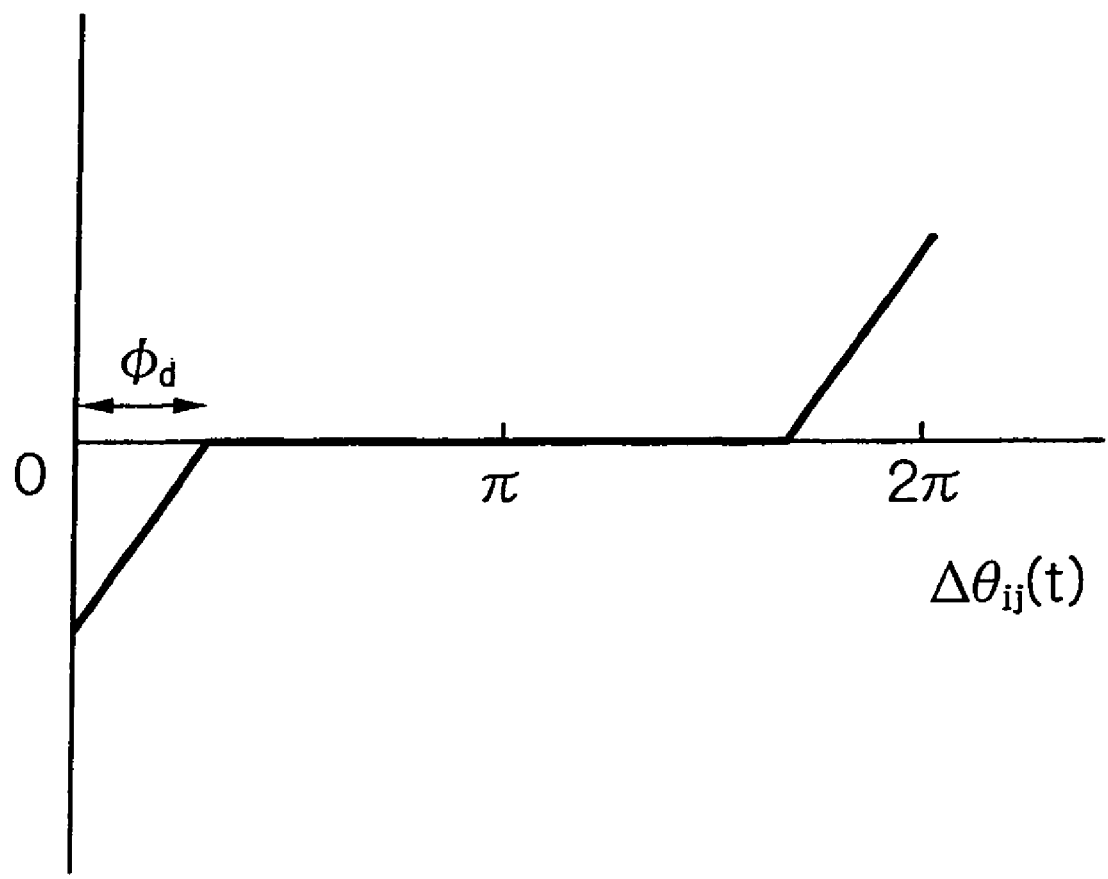
PHASE RESPONSE FUNCTION $R(\Delta\theta_{ij}(t))$

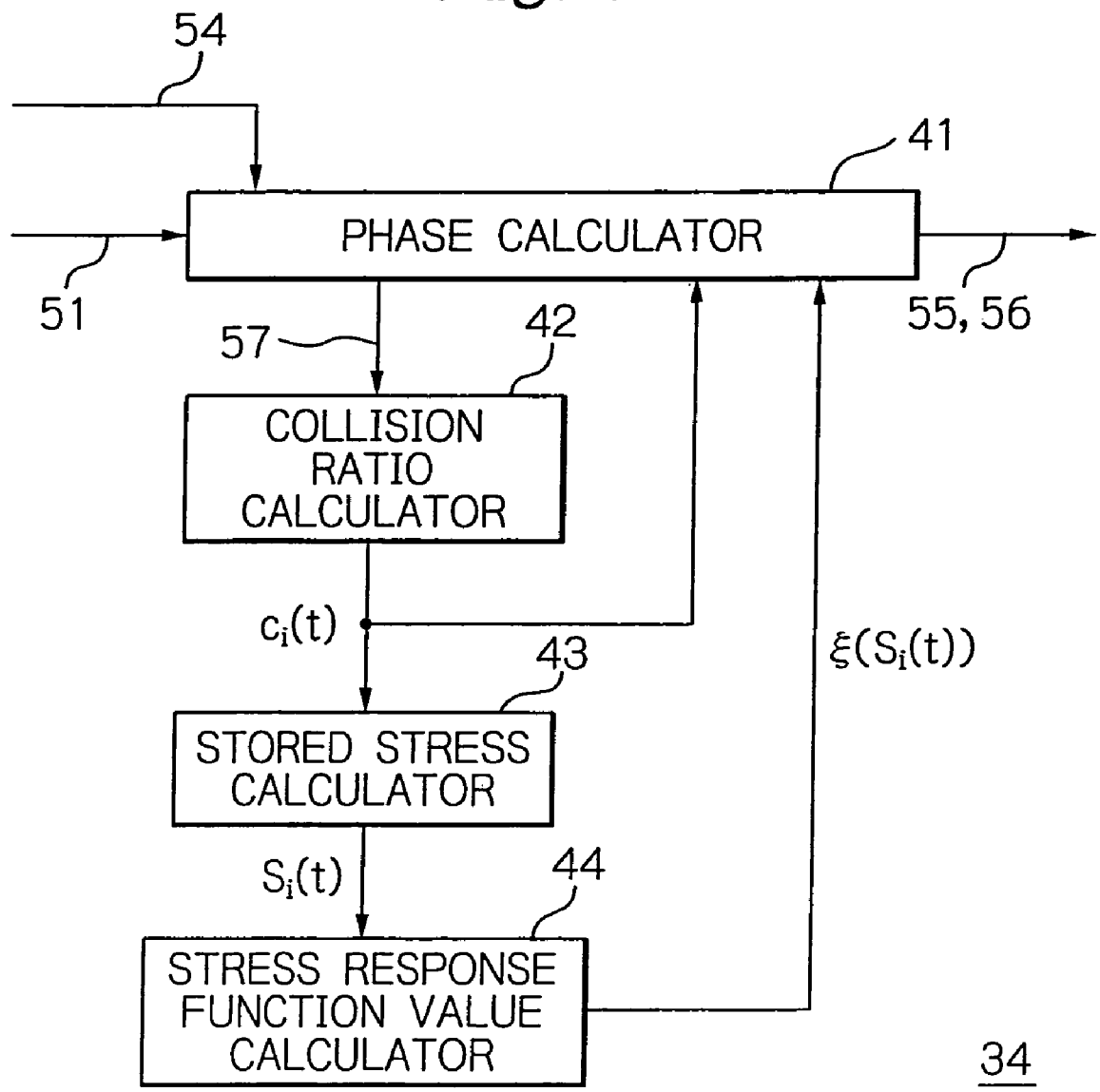

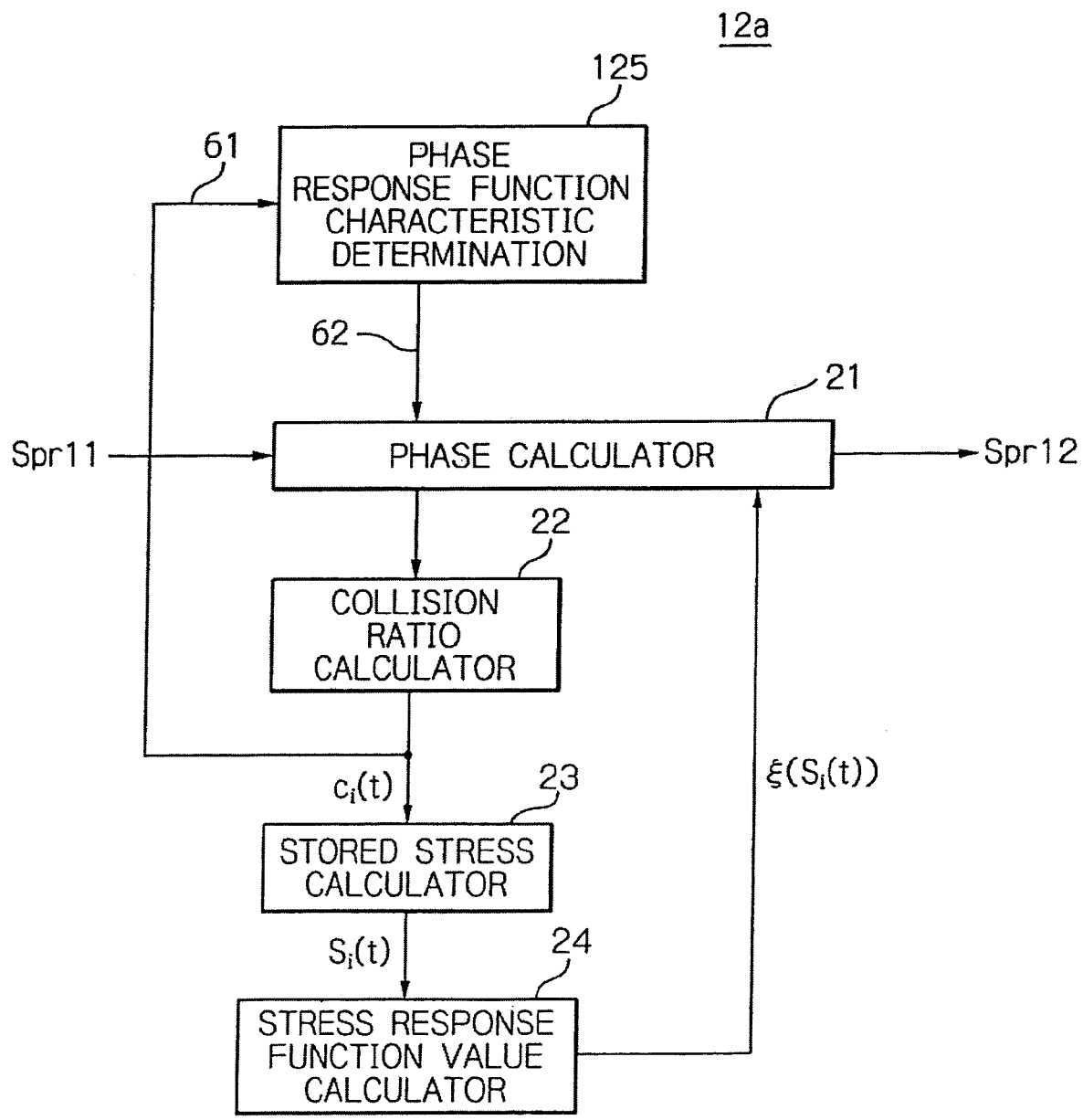

APPARATUS FOR CONTROLLING DATA TRANSMISSION TIMING RESPONSIVELY TO A CALCULATED COLLISION RATIO

BACKGROUND OF THE INVENTION

1. Field of the Invention

The present invention relates to apparatus for controlling communications, and more specifically to such apparatus to be included in a communication node forming a telecommunications network. The invention also relates to a method of controlling communications, and more particularly to a method of controlling communications in such a node.

2. Description of the Background Art

In a telecommunications system, such as a sensor network or a local area network (LAN), formed by a plurality of communication nodes spatially disposed in an area or carried on mobile bodies, data or signals are transmitted between those nodes with collisions therebetween avoided which may be caused by electromagnetic interference, for example.

In order to avoid such collisions to accomplish successful data transmission, there have been presented a variety of collision avoiding or detecting systems, such as a TDMA (Time Division Multiple Access) system and a CSMA (Carrier Sense Multiple Access) system represented by a CSMA/CA (Carrier Sense Multiple Access with Collision Avoidance) and a CSMA/CD (Carrier Sense Multiple Access with Collision Detection) system, as generally taught by Y. Matsushita, et al "Wireless LAN Architecture" pp. 47, 53-59 and 69, Kyoritsu Shuppan Co., Ltd., Tokyo, Japan, 1996.

In the CSMA system, a node intending to transmit data determines another node transmitting data by the presence of a carrier frequency so as to transmit data during the absence of transmission by the other nodes. In the CSMA system, the heavier the traffic between the nodes, the more the overhead, thus the efficiency in data transmission being inavoidably reduced.

In the TDMA system, time slots are specifically assigned to nodes, each of which transmits data in a specific time slot thus assigned. A TDMA system where nodes are dynamically changeable in data transmission may be designed such that one node, called control, or management, node, controls the adaptive assignment of the time slots to the nodes.

The TDMA system has a drawback that the malfunction of a control node would cause the entire communications system to fall down. The dynamic reassignment of time slots to nodes is so complicated in processing as not to cause the system to be quickly adaptive to erratic surrounding conditions. In addition, the TDMA system is not so flexible that the duration of the time slots is unchangeable.

SUMMARY OF THE INVENTION

It is an object of the present invention to provide apparatus to be included in a communication node for flexibly controlling communications.

It is another object of the present invention to provide apparatus to be included in a communication node for flexibly controlling communications to accomplish effective transmission without providing a control node managing the transmission timing of nodes.

It is a further object of the present invention to provide a method of for flexibly controlling communications in a communication node.

It is still another object of the present invention to provide a method of flexibly controlling communications to accomplish effective transmission in a communication node without providing a control node managing the transmission timing of nodes.

In accordance with the present invention, communication control apparatus to be included in a communication node forming a telecommunications network comprises a transmission timing calculator responsive to a state of a phase changing in an own node for determining a first timing at which the own node transmits data, wherein said transmission timing calculator comprises: a phase calculator operative in response to receiving a state variable signal, transmitted by a neighboring node and affected by a phase representative of a second timing at which the neighboring node transmits data, for changing a state of a phase of the own node in accordance with a time development rule; a collision ratio calculator for monitoring a phase difference of the own node with respect to the neighboring node, and operative in response to the phase difference for calculating a ratio of collision on the first and second timings; and a stress response function value generator for storing time-serially a stress value corresponding to the ratio of collision, and operative in response to the stored stress value for causing the time development rule to provide a phase shift with a value of the phase shift made at random.

Further in accordance with the invention, communication control apparatus to be included in a communication node forming a telecommunications network, comprises a transmission timing calculator responsive to a state of a phase changing in an own node for determining a first timing at which the own node transmits data, wherein said transmission timing calculator comprises: a phase calculator operative in response to receiving a state variable signal, transmitted by a neighboring node and affected by a phase representative of a second timing at which the neighboring node transmits data, for changing a state of a phase of the own node in accordance with a time development rule based upon a phase response function; a collision ratio calculator for monitoring a phase difference of the own node with respect to the neighboring node, and operative in response to the phase difference for calculating a ratio of collision on the first and second timings; and a phase response function characteristic determiner operative in response to the ratio of collision for changing a characteristic of the phase response function.

Still further in accordance with the invention, a method of controlling communication in a communication node forming a telecommunications network comprises the step of calculating a transmission timing in response to a state of a phase changing in an own node to determine a first timing at which the own node transmits data, said step of calculating the transmission timing comprising the substeps of: changing, in response to receiving a state variable signal, transmitted by a neighboring node and affected by a phase representative of a second timing at which the neighboring node transmits data, a state of a phase of the own node in accordance with a time development rule to calculate a phase; monitoring a phase difference of the own node with respect to the neighboring node, and calculating, in response to the phase difference, a ratio of collision on the first and second timings; and storing time-serially a stress value corresponding to the ratio of collision, and causing, in response to the stored stress value, the time development rule to provide a phase shift with a value of the phase shift made at random to generate a stress response function value.

Also in accordance with the invention, a method of controlling communication in a communication node forming a telecommunications network comprises the step of calculating a transmission timing in response to a state of a phase changing in an own node to determine a first timing at which the own node transmits data, said step of calculating the transmission timing comprising the substeps of: changing, in response to receiving a state variable signal, transmitted by a neighboring node and affected by a phase representative of a second timing at which the neighboring node transmits data, a state of a phase of the own node in accordance with a time development rule based upon a phase response function to calculate a phase; monitoring a phase difference of the own node with respect to the neighboring node, and calculating, in response to the phase difference, a ratio of collision on the first and second timings; and changing, in response to the ratio of collision, a characteristic of the phase response function to determine a phase response function characteristic.

BRIEF DESCRIPTION OF THE DRAWINGS

The objects and features of the present invention will become more apparent from consideration of the following detailed description taken in conjunction with the accompanying drawings in which:

FIG. 1 is a schematic block diagram showing a preferred embodiment of apparatus to be included in a communication node in accordance with the present invention;

FIG. 2 is a schematic block diagram showing a specific configuration of the transmission timing calculator included in the embodiment shown in FIG. 1;

FIG. 5 exemplarily plots a phase response function on which based is the transmission timing calculator in the illustrative embodiment;

FIG. 7 is a schematic block diagram, like FIG. 2, showing a specific configuration of the transmission timing calculator included in the embodiment shown in FIG. 6;

FIG. 8 depicts, similarly to FIG. 2, another alternative embodiment of the invention including the transmission timing calculator having a phase response function characteristic determiner and applicable to the embodiment shown in FIG. 1;

DESCRIPTION OF THE PREFERRED EMBODIMENTS

Figure 3C:
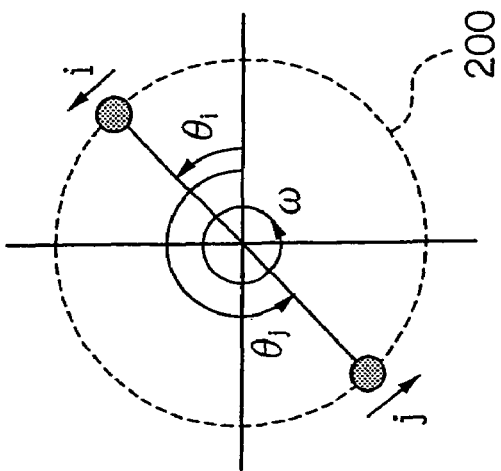
FIGS. 3A, 3B and 3C, and 4A, 4B and 4C show polar coordinates useful for understanding the tuning between the nodes in the illustrative embodiment.

With reference to FIG. 1, a preferred embodiment of communication control apparatus in accordance with the invention may advantageously be included in a communication node in a telecommunications system, such as a sensor network or an ad hoc network, which is formed by a plurality of communication nodes spatially disposed in an area to transmit data or signals therebetween with wireless interface.

In the illustrative embodiment, the telecommunications system includes communication nodes, one of which 10 is depicted, and each of which is adapted to transmit an impulse signal and effectively detects an impulse signal transmitted from a node other than itself, thus being interactive with the neighboring nodes to locally control the allotment of time slots in a self-control fashion.

The telecommunications system of the embodiment is applied to a wireless transmission network, and includes a plurality of communication nodes which are spatially disposed in an area and almost immobile during transmission.

Communication nodes forming the telecommunications network of the embodiment may be of the same structure, and therefore one of the apparatus 10 is illustrated in FIG. 1. As shown in the figure, the node 10 comprises an impulse signal receiver 11, a transmission timing calculator 12, an impulse signal transmitter 13, a tuning detector 14, a data transmitter and receiver 15 and a sensor 16, which are interconnected as illustrated. The impulse receiver 11, transmission timing calculator 12, impulse signal transmitter 13 and tuning detector 14 forms communication control apparatus.

The impulse signal receiver 11 is adapted for receiving an input impulse signal Sin11 transmitted by a node neighboring thereto to output a received impulse signal Spr11. In the context, a "neighboring" node is, for example, defined as a node staying in an area within which the electromagnetic waves emanating from the node in question are available. The input impulse signal Sin11 has been propagated from an output impulse signal transmitted by a neighboring node, and conveys no destination information. However, the impulse signals may contain any data information. Such impulse signals may be transmitted as timing signals, and may be of an impulse waveform having a distribution, such as Gaussian distribution. The impulse signal receiver 11 may be adapted to shape or regenerate the input impulse signal Sin11 to output the resultant received impulse signal Spr11. The received impulse signal is transferred to the transmission timing calculator 12.

The transmission timing calculator 12 is operative in response to the received impulse signal Spr11 to form and output a phase signal Spr12, which defines the transmission timing on the node 10. The transmission timing calculator 12 is adapted to form and output, even without receiving the received impulse signal Spr11, the phase signal Spr12. The transmission timing calculator 12 will be described more in detail later on.

Now, let the phase value of the phase signal Spr12 at a time t on a node in question i be $\theta_i(t)$, where i is a natural number. The transmission timing calculator 12 responds to the received impulse signal Spr11 to produce the phase signal Spr12 which changes in a nonlinear oscillating rhythm, defined as e.g. $\theta_i(t)$. The changing of the phase signal implements nonlinear characteristics which bring neighboring nodes to the oscillation having its phase opposite to, i.e. inverted from, or alternatively different from, each other so as to avoid collision therebetween. In other words, between neighboring nodes, an appropriate timing relationship, or time difference, is tried to be established in order for the output impulse signals Sout11 not to collide with respect to the transmission timing.

With reference to FIGS. 3A through 4C, the functional principle of the transmission timing calculator 12 will be described in detail. Those figures show the status transitions, which are also pertinent to the function of the impulse signal transmitter 13.

From FIGS. 3A through 4C, the relationship of one node of interest with neighboring nodes will be understood in terms of the phases, which change on a time axis in the respective nonlinear oscillating rhythms.

Figure 3B:
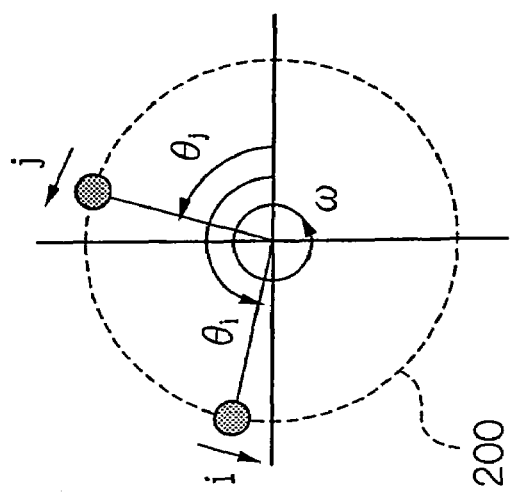
Figure 3A:
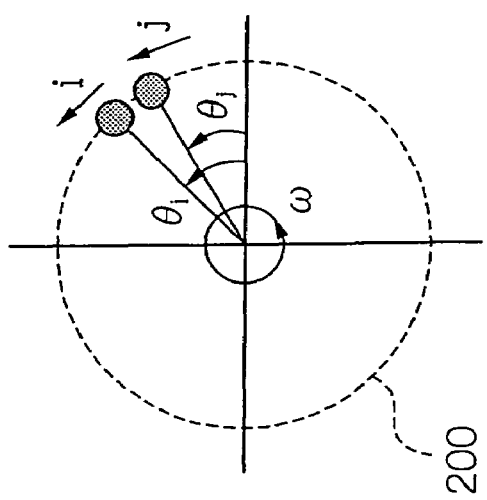

FIGS. 3A, 3B and 3C are directed to the case where one node of interest, or own node, i is in the vicinity of a single neighboring node j. The figures depict two material points i and j rotate on a circle 200 in the nonlinear oscillating rhythms respectively corresponding thereto. The angles θi and θj of the material points i and j, respectively, with respect to a reference axis, e.g. the axis of abscissas, represent the value of the phase signals at that time. The circular movement of the material points i and j is projected onto the axis of ordinates to represent the respective nonlinear oscillating rhythms. The two points i and j move in accordance with the expression (1) described later so as to come into the respective phases opposite to each other. If the two points i and j are close to each other as shown in FIG. 3A, the status changes as the time elapses through the state depicted in FIG. 3B as a transitional state to the stable state shown in FIG. 3C where the two points i and j are of the phase difference from each other which is approximately or substantially equal to $\pi$.

The two material points i and j rotate at the primary angular velocity equal to the respective specific angular oscillating frequency parameter, $\omega$, thereof. The primary angular velocity corresponds to the basic velocity at which a material point changes its state. When the two nodes become interactive in response to impulse signals transmitted therebetween, the two points i and j accordingly change the angular velocity thereof ahead or behind so as to ultimately establish the stable state at which the appropriate phase relationship is maintained. That function can be understood as the two points i and j repelling each other while rotating to establish the stable phase relationship. In the stable state, FIG. 3C, if each of the two nodes is in a predetermined phase, e.g. zero, to transmit the output impulse signal Sout11, then both nodes are brought into the transmission timing to establish the appropriate timing relationship with each other.

Figure 4A:
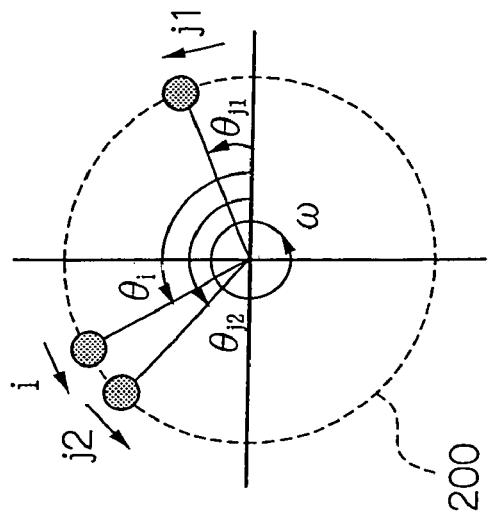
Figure 4B:
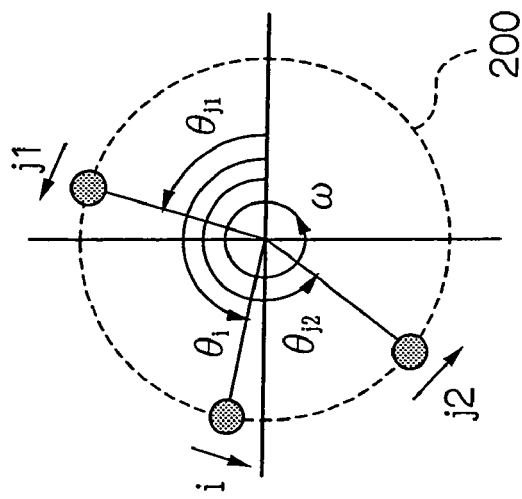
Figure 4C:
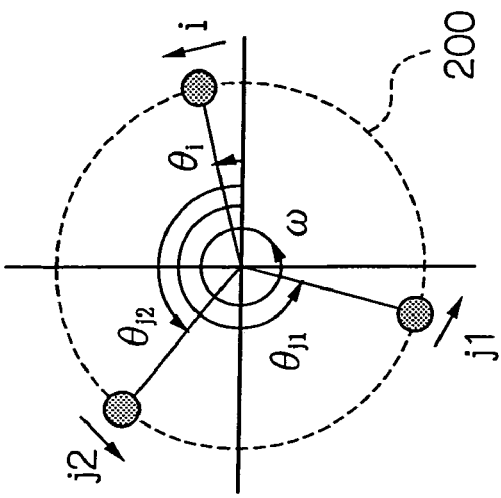

FIGS. 4A, 4B and 4C are directed to the case where one node of interest i is in the vicinity of two neighboring nodes j1 and j2. Also in that case including two neighboring nodes j1 and j2 existing, those points i and j1 and j2 repel each other while they rotate, like the case described above, to establish the stable phase relationship, specifically the stability in time relationship. That is also the case with more than two neighboring nodes existing.

The stable phase relationship, or stable state, thus established as described above has its feature extensively adaptive or flexible to the increase or decrease of neighboring nodes. For example, when the node of interest, or own node, i stays in the vicinity of the single neighboring node j1 with its stable phase relationship maintained as the stable state, the addition of the other neighboring node j2 transiently disturbs the stable state, and will establish through the transition state again an updated stable state in which the two neighboring nodes j1 and j2 are involved with respect to the node of interest i. The removal or malfunctioning of a neighboring node will cause such adaptive control on the phase relationship.

Well, returning to FIG. 1, the transmission timing calculator 12 delivers the phase signal Spr12, thus obtained and equal to θi(t), to the impulse signal transmitter 13, tuning detector 14 and data transmitter and receiver 15.

The impulse signal transmitter 13 is responsive to the phase signal Spr12 to transmit the output impulse signal Sout11. Specifically, when the phase signal Spr12 has its phase equal to a predetermined value, $\alpha$, which is equal to or more than zero and less than $2\pi$, the output impulse signal Sout11 will be transmitted. The predetermined value, $\alpha$, is preferably be fixed throughout the telecommunications system in question. For example, the predetermined value is set to zero in the system merely for an illustration purpose. With the example shown in FIG. 3C, the stable state involves the nodes i and j having the phase signal Spr12 thereof shifting from each other by the angle equal to $\pi$. The setting of the predetermined value to zero in the entire system still causes the output impulse signals Sour 11 to maintain the angular shift $\pi$ between the nodes i and j.

The received impulse signal Spr11 is transferred from the impulse signal receiver 11 also to the tuning detector 14. The tuning detector 14 is adapted for determining which of the states proceeds in the node of interest i and the one or more neighboring nodes, such as nodes j, j1 and j2, to mutually control the timing of transmitting the output impulse signals Sout11. Specifically, determination is made between the transient state as shown in FIGS. 3B and 4B, and the stable state as shown in FIGS. 3C and 4C. The tuning detector 14 monitors the timing of the occurrence of the received impulse signal Spr11, coming from the output impulse signal Sout11 transmitted from other nodes, and of the output impulse signal Sout11 of its own. If the tuning detector 14 finds out a temporal stability in the timing difference between the occurrences of the impulse signals transmitted to and from those nodes, it determines the control having fallen in its stable state. With the specific embodiment, as a signal used for monitoring the timing of the occurrence of its own output impulse signal Sout11 the phase signal Spr12 output from the transmission timing calculator 12 is interconnected to the tuning detector 14 rather than its own output impulse signal Sout11.

In operation, the tuning detector 14 proceeds to the tuning detection to read below. The tuning detector 14 monitors the value, $\beta$, of the phase signal Spr12 at the timing when it receives the received impulse signal Spr11 from the impulse signal receiver 11 during the period of time equal to the one period of the phase signal Spr12. From the monitoring, assume that a series of resultant values, $\beta 1, \beta 2, \ldots, \beta N$ have been obtained as the value, $\beta$, of the phase signal Spr12, where $0 < \beta 1 < \beta 2 < \ldots < \beta N < 2\pi$, and N is a natural number.

From the obtained values, $\beta 1, \beta 2, \ldots, \beta N$, of the phase signal Spr12, calculated is the difference in phase between the adjacent values, $\Delta 1 = \beta 1, \Delta 2 = \beta 2 - \beta 1, \ldots, \Delta N = \beta N - \beta(N-1)$.

The two steps described above are repeated in every period of the phase signal Spr12 to calculate a series of transitional amounts, or differences, in the phase difference, $\Delta$, between the periods preceding and following thereto, such as $\gamma 1 = \Delta 1(\tau+1) - \Delta 1(\tau), \gamma 2 = \Delta 2(\tau+1) - \Delta 2(\tau), \ldots, \gamma N = \Delta N(\tau+1) - \Delta N(\tau)$, where $\tau$ and $\tau+1$ respectively denote a period in question and the period following thereto of the phases signal Spr12.

If the transitional amounts, $\gamma 1, \gamma 2, \ldots, \gamma N$, are all smaller than a threshold, $\epsilon$, which is a minute parameter, namely, the condition, $\gamma 1 < \epsilon, \gamma 2 < \epsilon, \ldots, \gamma N < \epsilon$, is satisfied, then the tuning detector 14 determines that the phase control is in its stable state.

The tuning detector 14 may be adapted to determine that the phase control is in its stable state if the condition stated above is satisfied continuously over a plurality, M, of periods of the phase signal Spr12, where M is a natural number. The larger the number M, the stabler the stable state detected. The stable state may be detected on the basis of some of the received impulse signals Spr11

The tuning detector 14 provides the data transmitter and receiver 15 in every period of the phase signal Spr12 with the tuning detection signal Spr13 resultant from the tuning detection as well as a slot signal Spr14, which is the minimum value, $\beta 1$, in this example, of the value, $\beta$, of the phase signal Spr12 at the timing of the occurrence of the received impulse signal Spr11. The slot signal Spr14 representative of the minimum value, $\beta 1$, provided by the tuning detector 14 is associated with the predetermined value, $\alpha$, set to zero for the illustrative purpose as described earlier. The selection of the value, α, affects the resultant values, β, to be applied to the slot signal Spr14.

It is now to be noted that the node in question 10 functions as transferring data received from one node to another and as transmitting data originating from itself. The node 10 includes the sensor 16, as an example serving as originating data. The sensor 16 may be adapted to get or sense physical or chemical environmental information Sin13, such as the intensity of sound or vibration, the concentration of chemical material and temperature, and provide the data transmitter and receiver 15 with a resultant sensor data Spr15. As an exemplified function of transferring received data, the data transmitter and receiver 15 is interconnected to receive an input data signal Sin12, which comes from an output data signal Sout12 transmitted from a neighboring node.

The data transmitter and receiver 15 is adapted for transmitting to another node the output data signal Sout12, which is representative of the sensed data Spr15 and/or the input data signal Sin12. The data transmitter and receiver 15 responds to the tuning detection signal Spr13 indicating the stable state to transmit the output data signal Sout12 in a time slot described later. The transmitter and receiver 15 halts transmission when the tuning detection signal Spr13 indicates the transitional state. The words "time slot" are applied to that situation although they are not directed to a time segment fixedly assigned by the telecommunications system. The output data signal Sout12 may be transmitted at a transmitting frequency falling in the same frequency band as the output impulse signal Sout11.

The time slot has its duration equal to the period of time in which the phase signal has its phase, θi(τ), satisfying the condition, δ1<=θi(τ)<=β1−δ2. The time slot opens at the timing of the completion of the transmission of the output impulse signal Sout11. The value, δ1, is defined as the value of the phase signal at the timing of the time slot opening. The time slot closes at the timing prior by a small offset value, δ2, to the timing at which the first received impulse signal Spr11 appears in each period of the phase signal Spr12. The value of the phase signal at the closure of the time slot is defined as equal to β1−δ2. Those values, δ1 and δ2, are a phase width corresponding to a very short period of time for ensuring that the wireless or radio space involving the node in question 10 does not include simultaneously both impulse and data signals regardless of those signals being transmitted by itself or other nodes. The values, δ1 and δ2, may be determined through an experiment under the condition where the node 10 is installed.

For example, with the stable state as depicted in FIG. 3C, the node i starts transmitting the output impulse signal Sout11 when the phase, θi, is equal to zero, and completes the transmission of the output impulse signal Sout11 prior to the phase, θi, being equal to δ1. When the phase, θi, gets equal to δ1, the node i starts transmitting the output data signal Sout12, and when the phase, θi, is equal to β1−δ2, it stops transmitting the output data signal Sout12. Until the phase, θi, becomes equal to zero again, the node i halts transmitting both the output impulse and data signals Sout11 and Sout12. The other node j is in response to the phase, θj, to operate in the similar fashion. However, the phases, θi and θj, differ from each other approximately by π, thus avoiding the transmitting operation from colliding. That is also the case with the situation where there exist three or more nodes, thus avoiding collision of transmission operation.

Well, detail description will be made on the transmission timing calculator 12 with reference to FIG. 2, which schematically illustrates the transmission timing calculator 12 in a block diagram. The transmission timing calculator 12 comprises a phase calculator 21, a collision ratio calculator 22, a stored stress calculator 23 and a stress response function value calculator 24 which are interconnected as depicted in the figure.

The transmission timing calculator 12 is as described above adapted to determine by calculation when the output impulse signal Sout11 is to be transmitted. The transmission timing calculator 12 performs that calculation for determining the transmission timing in accordance with a formula based upon a model of nonlinear oscillation exemplified by the following expression (1).

$$\frac{d(\theta i(t))}{dt} = \omega i + \sum_{j=1}^{N} Pj(t) \cdot R(\Delta\theta ij(t)) + \xi(Si(t)) \quad (1)$$

$$\Delta\theta ij(t) = \theta j(t) - \theta i(t) = -\theta i(t) \quad (2)$$

The expression (1) is an equation defining the rule of changing on a time axis the rhythm of nonlinear oscillation in a node of interest i in response to the received impulse signal Spr11. That rule is referred to as a time development rule. The received impulse signal Spr11 corresponds to the output impulse signal Sout11 transmitted by a neighboring node, of course.

In the expression, a variable, t, represents time, and the function, θi(t), denotes the phase on the nonlinear oscillation of a node of interest at the time, t. The function, τi(t), always takes, by the operation of mod 2π, a value equal to zero or more and less than 2π, i.e. falling in the section, 0<=θi(t)<2π. The expression, mod 2π, represents the operation of dividing by 2π and take a resultant residual.

The function, Δθij(t), represents the phase difference, as defined by the expression (2), resultant from the subtraction of the phase, θi(t), of the node of interest i with respect to the phase, θij(t), of its neighboring node j. When the respective nodes transmit the output impulse signal Sout11 while the phase, θi(t), is equal to zero, the phase difference, Δθij(t), which the node of interest i is capable of monitoring is only a value available at the timing when the node i receives the output impulse signal transmitted by the neighboring node j. Such a value therefore appears only once in each period. Under that circumstance, the phase difference, Δθij(t), is rendered equal to −θi(t) as represented by the expression (2). It is to be noted that the phase difference, Δθij(t), shall be resultant from the operation of mod 2π on a value added with 2π to take a value falling in the section, 0<=θi(t)<2π merely for convenience. In the illustrative embodiment, the phase difference, Δθij(t), shall be considered as an amount as stated above. In the description above, it is assumed that the respective nodes transmit the output impulse signal Sout11 while the phase, θi(t), is equal to zero. That assumption does not degrade the generality of the application at all. Even when the respective nodes transmit the output impulse signal Sout11 while the phase, θi(t), takes a value other than zero, the system may be operative in the similar way.

The parameter, ωi, is a specific oscillation frequency parameter, which is representative of a primary rhythm inherent in a node in question. In the illustrative embodiment, the parameter, ωi, takes a predetermined value defined throughout the system by way of example.

The function, Pj(t), defines the received impulse signal Spr11 transmitted by the neighboring node j. That function defines a timing signal which has its function curve like an impulse shape, such as rectangular waveform or Gaussian distribution, the timing signal not carrying data but defining the timing. The function, Pj(t), has its pulse duration and amplitude determined through an experiment, for example.

The other function, R(Δθij(t)), is a phase response function defining a response characteristic of changing the primary rhythm of the node of interest i in response to the received impulse signal Spr11 input. The number, N, denotes, as stated earlier, the total number of the neighboring nodes involved in a spatial area which have transmitted the output impulse signal Sout11 that can be received by the node of interest i as the received impulse signal Spr11.

The remaining function, ξ(Si(t)), forms a term serving as storing a stress value if the relative phase difference of a neighboring node against the node of interest i is smaller, and shifting the phase with a random amount in dependence upon the stored stress value, Si(t). The relative phase difference is defined by the following expression (3), where the phase difference is Δθij and the relative phase difference is E.

$$E = \Delta\theta ij \text{ if } \Delta\theta ij <= \pi,$$

$$E = 2\pi - \Delta\theta ij \text{ if } \Delta\theta ij > \xi. \quad (3)$$

The function, ξ(Si(t)), is thus representative of a response characteristic to the stored stress value, Si(t). The function, ξ(Si(t)), will hereinafter be referred to as a stress response function.

The illustrative embodiment is particularly advantageous in that there is no centralized control node but the interaction between a node of interest with neighboring nodes causes the phase signals to change which accord to the model defining the nonlinear oscillation to thereby assign time slots in a distributed self-control manner. The embodiment is also advantageous in that in order to avoid the situation where even a very much small relative phase difference of the node of interest from neighboring nodes causes a node to converge to the stable state the stress response function, ξ(Si(t)), is introduced as a model defining the nonlinear oscillation.

Prior to describing specific examples of the stress response function, ξ(Si(t)), and the phase response function, R(Δθij (t)), the terminology on those functions will be described.

(a) Collision of Data Transmission

Let the phase width φc which corresponds to the minimum duration, Wmin, of a time slot required for a node transmitting data. The phase width, φc, may be a product of Wmin by the specific oscillation frequency parameter ωi. In addition, Wmin is a constant parameter dependent upon usage, etc.

When a node in question has its relative phase difference with respect to neighboring nodes, residing in a spatial area in which the node in question can receive the impulse signals transmitted by the neighboring nodes, smaller than the phase width, φc, it is determined that collision occurs in data transmission. Among the plural received impulse signals Spr11, if at least one received impulse signal has its relative phase difference smaller than the phase width, φc, it is then understood that collision has occurred.

(b) Example of Calculating a Collision Ratio on the Basis of a Collision Period of Time In a node i, the function, xi(t), representing whether or not collision occurs in transmitting data at the time, t, is defined by the expression (4) to read below:

$$xi(t) = \begin{cases} 1 & \text{collision} \\ 0 & \text{else} \end{cases} \quad (4)$$

-continued $$yi(t) = \int_{-n \cdot Ti}^{t} xi(\tau)d\tau \quad (5)$$

$$ci(t) = \frac{\omega i \cdot yi(t)}{n \cdot \varphi c} \quad (6)$$

The function, xi(t), takes its value equal to unity when collision occurs at the time, t, and otherwise zero. The cumulative collision time, yi(t), accumulated in a plurality (n) of periods is obtained by the expression (5), specifically by integrating in time the values of the function, xi(t), during the n periods, where n is a natural number. In the expression (5), Ti represents the period on a node of interest i. The accumulated collision time, yi(t), is the total sum of the periods of time in which the function, xi(t), takes the value of one in the n periods, and thus may be obtained by monitoring the values of the function, xi(t).

The value, ci(t), results from normalizing the accumulated collision time, yi(t), by the maximum accumulated collision time, and represents the temporal ratio of collisions having occurred in the n periods, thus being referred to as collision ratio or ratio of collision. The maximum accumulated collision time is the maximum value of the accumulated collision time, yi(t). If the nodes perform transmission by means of a time slot having its duration, Wmin, equal to φc/ωi, the maximum value of the accumulated collision time over the n periods will be n·Wmin, which is equal to n·φc/ωi. The collision ratio, ci(t), can therefore be calculated through the expression (6).

In the respective nodes, the phase, θ, thereof changes in accordance with the expression (1), thus causing the period, T, to take different values depending upon those periods. This may cause such a situation to occur where the accumulated collision time, yi(t), exceeds the maximum accumulated collision time, n·Wmin, i.e. the collision ratio, ci(t), exceeds unity. In such a situation, when the collision ratio, ci(t), exceeds unity, it shall be dealt with as equal to one.

The definition of the collision ratio described above is directed to the example in which it is not considered whether or not plural collisions have concurrently occurred. The definition of the collision ratio is however not restricted to that specific one. For example, it may be taken into account that plural collisions have concurrently occurred to define the collision ratio. Additionally, the definition of the collision ratio described above is directed to the calculation of the collision ratio on the basis of collision time. The collision ratio may also be calculated on the basis of how many times collisions have occurred.

(c) Example of Calculating a Collision Ratio on the Basis of the Collision Number of Times At first, it is monitored in each period whether or not collision has occurred. It is considered only whether or not collision has occurred in a period, so that, even when collision has occurred plural times in a period, the counting of the times of collision saturates to one.

Next, the number of times at which collisions have occurred over n periods is counted. Namely, the accumulated collision number of times, γ, is counted.

Now, define the collision ratio as a value resultant from normalizing the accumulated collision number of times, γ, by the maximum accumulated collision number of times, which is the maximum number of times at which collisions possibly occur over the n periods. This means that the collision ratio, ci(t), is defined by the following expression (7).

$$ci(t)=\gamma/n. \quad (7)$$

Also when calculating the collision ratio based upon the definition expression (7), there could be a case in which the resultant collision ratio exceeds unity, as with the expression (6). If the collision ration, ci(t), exceeds unity, it shall also be dealt with as equal to one. Additionally, the definition of the collision ratio described above is also the example without considering how many times collisions have occurred in one period but merely whether or not collision has occurred in one period. It may be possible to arrange the system considering the number of times at which collisions have occurred in a period.

The definition of the collision ratio described under the items (a) (b) and (c) may be expressed with the collision period of time and the collision number of times generalized into a collision amount to read below.

Over n periods, the accumulated collision amount is monitored, and the collision ratio is defined by normalizing the accumulated collision amount with the maximum accumulated amount, which is the maximum amount possibly occurring over the n periods. The collision calculator 22, FIG. 2, is adapted for receiving from the phase calculator 21 a signal 25 representing whether or not data transmission collides to obtain by calculation the collision ratio, ci(t), defined by the expression (6) or (7).

The phase calculator 21, FIG. 2, is operative on the phase response function, R(Δθij(t)), of which an example and the operation will be described below. The response function, R(Δθij(t)), is for example defined by the expressions (8-1) (8-2) and (8-3). FIG. 5 schematically plots the response function, R(Δθij(t)), defined by the expressions (8-1) (8-2) and (8-3).

$$R(\Delta\theta ij(t)) = \begin{cases} \alpha \cdot (\Delta\theta ij(t) - \varphi d) & \Delta\theta ij(t) \le \varphi d & (8\text{-}1) \\ 0 & \varphi d < \Delta\theta ij(t) < 2\pi - \varphi d & (8\text{-}2) \\ \alpha \cdot (\Delta\theta ij(t) + \varphi d - 2\pi) & \Delta\theta ij(t) \ge 2\pi - \varphi d. & (8\text{-}3) \end{cases}$$

In the above expression, $\varphi d$ and $\alpha$ are constant parameters, of which the value is determined through experiment. The constant parameter, $\varphi d$, takes its value equal to or more the minimum phase width, $\varphi c$, required for transmitting data, i.e. $\varphi d >= \varphi c$. The phase response function, R(Δθij(t)), indicated above includes a nonlinear function changing the phase, θi(t), of the node of interest i with respect to the neighboring node j in the direction of effecting the repulsion force. Specifically, the phase response function has its characteristic changing, when the relative phase difference, Δθij(t), of the node of interest i from the neighboring node j is equal to or less than $\varphi d$, the phase in the direction of effecting the repulsion force. The provision of the phase response function, R(Δθij(t)), with that characteristic causes the dynamic characteristic to be established to raise the relative phase difference, Δθij(t), of the node of interest i against the neighboring node j to a value equal to or more than $\varphi c$ required for avoiding collision.

It is needless to say that the phase response function, R(Δθij(t)), is not restricted to the function described above. Any functions defining a dynamic characteristic raising the relative phase difference of the node of interest with respect of a neighboring node may be applicable in various forms.

Well, description will be made on specific examples and operations of the stress response function, ξ(Si(t)), resultant from the calculations performed in sequence in the stored stress calculator 23 and the stress response function value calculator or generator 24, FIG. 2. The stress response function, ξ(Si(t)), is defined by, for example, the expressions (9-1) (9-2) (10-1) (10-2) and (11) to read below:

$$\xi(Si(t)) = \begin{cases} q(Si(t)) & t = m \cdot n \cdot Tk & (9\text{-}1) \\ 0 & t \ne m \cdot n \cdot Tk \ (m = 1, 2, \ldots) & (9\text{-}2) \end{cases}$$

$$q(Si(t)) = \begin{cases} \mu & \text{with prob} \quad Si(t) & (10\text{-}1) \\ 0 & \text{with prob} \quad 1 - Si(t) & (10\text{-}2) \end{cases}$$

$$Si(t) = \int_{tS}^{t} s(ci(\tau))d\tau \quad (11)$$

In the expression (11), the function, s(ci(t)), represents a stress value with respect to the collision ratio, ci(t), at the time, t. For example, the function may be implemented of the characteristic in which the higher the collision ratio, ci(t), the larger the stress value. By way of example, a nonlinear function, such as the sigmoid function, may be applied to implementing the characteristic showing the abruptly increasing stress values with the collision ratio increasing.

The function, Si(t), defined by the expression (11) is representative of the value resultant from the accumulation, or integration in time, of the stress value, s(ci(t)), at the time, t. The time section during which the accumulation is performed up to now, t, from the immediately previous time, ts, when a random phase shift is carried out in dependence upon the stored stress value, Si(t). More specifically, the function, Si(t), has its value reset once the random phase shift is carried out, and re-starts accumulating its stress value, s(ci(t)), from that time. The integration defined by the function, Si(t), may be implemented by the summation of the stress values, s(ci(t)), at the discrete time points, t, if applicable. The stored stress value, Si(t), is calculated by the stored stress calculator 23.

The function, q(Si(t)), defined by the expression (10-1) or (10-2) produces a random number at a probability corresponding to the stored stress value, Si(t). The function produces a value, μ, at the probability, Si(t), and zero at the probability, 1-Si(t). The value, μ, is a random number falling in the range equal to or more than ε and less than δ, namely, ε<=μ<δ, where ε and δ are constant parameters determined through experience.

The stress response function, ξ(Si(t)), evaluates the stored stress value, Si(t), every n-th period and produces a random value, μ or zero, at the probability according thereto. The stress response function, ξ(Si(t)), is used by the stress response function value calculator 24.

Accordingly, as defined by the expression (1) indicated earlier, the introduction of the stress response function, ξ(Si(t)), to the model of nonlinear oscillation accomplishes operations of the evaluation of the stored stress value, Si(t), at every n-th period, and the random phase shift carried out at the probability based upon the evaluated value. Specifically, the more the stress values caused by collision, the higher the probability at which the random phase shift is carried out. At a time except the time corresponding to every an integral multiple of the n periods, the stress response function, ξ(Si(t)), takes its value equal to zero, thus performing no random phase shifting. It is to be noted that the period of time in which the stress is stored is not restricted to the n periods stated above but may be the period of time from the time, ts, at which the preceding random phase shifting is performed to the present time, t. That means that, for example, when the stress value, s(ci(t)), even smaller, continues to be accumulated over a period of time longer than the n periods, the cumulative stress value, Si(t), ultimately becomes extensive so as to give rise to the random phase shifting.

The phase calculator 21 applies the stress response function value, ξ(Si(t)), whilst calculating the phase, θi(t), defined by the expression (1).

The transmission timing calculator 12, performing the appropriate operations described above, may be implemented in the form of software, or program sequences, or alternatively in the form of hardware, or electronics, carrying out the operations. Of course, the implementation may be in the form of software partly implemented by hardware.

For example, the operation defined by the expression (1) may be implemented on a communication node by general software, such as the Runge-Kutta method. The Runge-Kutta method is one of the methods using a difference equation, or recurrence equation, resultant from differentiating a differential equation, or making the continuous time variable, t, discrete, i.e. quantization, to calculate a change, or temporal development, of a state variable. The Runge-Kutta method is taught as a general background knowledge in H. Togawa, "Scientific Engineering Calculation Handbook by UNIX Workstation-Volume Fundamental, C-Language Version" published by Saiensu-sha Co., Ltd., Tokyo, for example.

According to the illustrative embodiment, in a communication network without being provided with a centralized control node, the nodes involved are interactive with neighboring nodes thereof through the transmission and reception of impulse signals therebetween to allot time slots under local self-control to establish transmission.

The illustrative embodiment can extensively avoid the circumstance where some node fails to obtain a time slot having its duration at least required for transmitting data to substantially transmit data, thus improving the stability and transmission efficiency in transmitting data between nodes.

Now, referring to FIGS. 6 and 7, an alternative embodiment of the invention will be described. The illustrative embodiment shown in FIGS. 1 and 2 is adapted to transmit the output impulse signal Sout11 mutually by the communication nodes involved. The output impulse signal Sout11 is employed as the means for functioning the interaction between the nodes, i.e. affecting the phase states of the nodes. The means for affecting the interaction of the communication nodes are not restricted in accordance with the present invention to those involved in the embodiment shown in FIGS. 1 and 2.

For example, the phase, θi(t), described with reference to the embodiment shown in FIGS. 1 and 2, may directly be transmitted so as to accomplish the interaction. Specifically, communication nodes may be adapted to be informed of the changes in operative state of the phase shifting or the like in the nodes in the form of continuous signals transmitted to and from the nodes.

The alternative embodiment which will be described is adapted for transmitting a phase signal continuously to and from communication nodes to thereby be made interactive with each other. FIG. 6 shows the alternative embodiment of a node adapted for continuously transmitting phase signals.

The node 30 in accordance with the illustrative embodiment comprises a phase signal receiver 31, an interference detector 32, a data transmitter and receiver 33, a transmission timing calculator 34 and a phase signal transmitter 35, which are interconnected as illustrated. The node 30, of course, includes components corresponding to the tuning detector 14 and the sensor 16, not specifically illustrated though. The data transmitter and receiver 33 may be adapted identically to the data transmitter and receiver 15, FIG. 1.

The phase signal receiver 31 may be provided alternatively to the impulse signal receiver 11, FIG. 1. The phase signal receiver 31 is adapted for receiving an input phase signal Sin31 to extract information carried by the signal. The input phase signal Sin31, received by the node of interest 30, may be a continuous signal transmitted by another node. The input phase signal Sin31 defines the phase signal, θj(t), and the identification, e.g. the number, of an interference band, on the other node j. The input phase signal Sin31 is a continuous signal, e.g. phase-modulated (PM) signal, at a frequency defined by the interference band number with the phase signal, θj(t), incorporated. The phase signal receiver 31 provides the transmission timing calculator 34 with the phase signal, θj(t), 51 which is included in the input phase signal Sin31 transmitted by the other node j, as well as the interference detector 32 with the detection result signal 52 representing the receiving state detected in the form of, e.g. the number of the interference band and the receiving timing.

The interference detector 32 is adapted for responding to the detection result signal 52 provided from the phase signal receiver 31 to determine whether or not the interference band number included in the output phase signal Sout31 is duplicate between plural nodes, i.e. interference occurs, thus providing the communication timing calculator 34 with a result 53 from the interference determination and the phase signal transmitter 35 with the result from the interference determination and interference band number 54.

The transmission timing calculator 34 may be the same as the transmission timing calculator 12, FIG. 1, and adapted to be responsive to the phase signal, θj(t), of the other node, etc., to form the phase signal, θi(t), of the node of interest 30. The phase signal, θi(t), of the node of interest 30 will be delivered to the data transmitter 33 and the phase signal transmitter 35 in the form of signals 55 and 56, respectively. The transmission timing calculator 34 will later be described in detail.

The phase signal transmitter 35, which may be provided alternatively to the impulse signal transmitter 13, FIG. 1, is adapted to transmit the output phase signal Sout31, which incorporates the phase signal, θi(t), 56 of the node of interest 30 to transmit the output phase signal Sout31.

The alternative embodiment is adapted for transmitting the output phase signal Sout31 and the output data signal Sout32 of the node of interest 30 at frequencies different from each other. In addition, the frequency band for use in transmitting the output phase signal Sout31 comprises an integral plurality, Nb, of subbands.

In a telecommunications network comprising a plurality of nodes 30, when the system starts its operation, those nodes perform the initializing operation thereof to read below. Generally, in the initializing operation, the phase signal is transmitted and received to and from the neighboring node to arbitrate the frequency subbands available to the own and neighboring nodes.

Initially as the first step, the node 30 selects at random one of the Nb frequency subbands, and transmits the output phase signal Sout31 at the selected subband.

In the second step, the node 30 in turn determines whether or not any neighboring nodes have transmitted the output phase signal Sout31 in the same frequency subband by means of the receiving state contained in the input phase signal Sin31. If normal reception is determined of the input phase signal Sin31 in all those subbands, it is then determined that no interference occurs. By contrast, if it fails to receive, then it determines that interference occurs. Any subbands, when no carrier is sensed, are determined unused. If there exists a frequency subband in which interference is detected, the node 30 inserts the number of the interfering subband into the output phase signal Sout 31 of the node in question 30 to transmit the latter.

In the third step, in the case (a) or (b) read below, the node of interest 30 shifts the frequency subband in which it transmits the output phase signal Sout31 at the probability, P, and maintains the frequency subband at the probability, 1-P, where P is a constant parameter determined through experiment. The shifting of a usable subband is attained by selecting at random one of the subbands which is not used at that time.

(a) The case in which coincidence occurs between the number of the frequency subband which the node of interest 30 uses to transmit the output phase signal Sout31 and the number specific to an interfering subband and inserted into the input phase signal Sin31 transmitted by a neighboring node.

(b) The case in which coincidence occurs between the number of the frequency subband which the node of interest 30 uses to transmit the output phase signal Sout31 and the number specific to a subband in which the input phase signal Sin31 transmitted by a neighboring node fails to normally be received.

Finally as the fourth step, if the node of interest 30 does not find out any frequency subbands in which the input phase signal Sin31 fails to be normally received and all the input phase signals Sin31 received do not contain the number indicative of an interfering subband inserted, it determines that the neighboring nodes are successful in transmitting and receiving the output phase signals Sout31 in the frequency subbands different from each other. That state will hereinafter be referred to as a stable interactive state.

When the initializing operation described above establishes the stable interactive state, the transmission timing calculator 34 starts its operation to read below. However, for example, if a node is newly involved after the stable interactive state has once been established, the stable state is disturbed to possibly cause an interfering subband to be involved. In that case, control will again be made on the second, third and fourth steps stated above to establish a stable interactive state except for the newly involved node, on which control will be made through the first to fourth steps.

Well, description will be made in detail on the structure and function of the transmission timing calculator 34. The transmission timing calculator 34 may be identical with the transmission timing calculator 12, FIG. 2. As illustrated in FIG. 7, the transmission timing calculator 34 comprises a phase calculator 41, a collision ratio calculator 42, a stored stress calculator 43 and a stress response function value calculator 44 interconnected as depicted in the figure. The transmission timing calculator 34 may function, once the stable interactive state has been established, in substantially the same manner as the transmission timing calculator 12. The phase calculator 41 is adapted, similarly to the collision calculator 22, FIG. 2, for receiving from the phase calculator 41 a signal 57 representing whether or not data transmission collides to obtain the collision ratio, ci(t). The phase calculator 41 is additionally adapted to perform the initializing operation for establishing a stable interactive operation.

The transmission timing calculator 34 is adapted for carrying out, once a stable interactive state has been established, the calculation for determining the timing, as described above, at which the output phase signal Sout31 is transmitted. The timing calculator 34 uses a formula, such as the expression (12), modeling a nonlinear oscillation to perform calculation determining a transmission timing.

$$\frac{d\theta i(t)}{dt} = \omega i + \frac{K}{N}\sum_{j=1}^{N} R(\Delta\theta ij(t)) + \xi(Si(t)) \quad (12)$$

The embodiment shown in FIG. 2 is adapted to make a decision in response to a received impulse signal transmitted by another node whereas the alternative embodiment is adapted to make a decision in response to a phase signal transmitted by another node. The alternative embodiment is therefore adapted for applying the expression (12) rather than the expression (1). In the expression (12), K is a constant parameter, of which the value is determined through experiment. The remaining functions and parameters may substantially be the same as the embodiment shown in FIG. 2. Strictly speaking, difference exists in detail that, for example, the phase of another node is directly provided or obtained from a received impulse signal. Detailed description thereon will be avoided.

Description will be made on how the transmission timing calculator 34 proceeds to establishing the phase signal, $\theta i(t)$, of the node in question in accordance with the expression (12) with emphasis added on the differences from the transmission timing calculator 12.

With the alternative embodiment, concerning collision on transmitting data, assume that each of the communication nodes is adapted to transmit data during a time segment in which its phase, $\theta i(t)$, falls in the range from zero inclusive to $\phi c$ exclusive, i.e. $0<=\theta i(t)<\phi c$, where $\phi c$ represents a phase width corresponding to the duration of a minimum time slot required. When the phase, $\theta i(t)$, of the node of interest i falls in that range, i.e. $0<=\theta i(t)<\phi c$, and some of the neighboring nodes j take the phase thereof falling in the corresponding range, $0<=\theta j(t)<\phi c$, it is understood that collision on transmitting data takes place. With the alternative embodiment, the words "collision on transmitting data takes place or occurs" are used in that context. It may be possible, similarly to the illustrative embodiment shown in FIG. 1, that collision on transmitting data occurs when each of the nodes has its phase difference with respect to neighboring nodes included in a spatial region in which it can receive phase signals transmitted by the neighboring nodes smaller than the value equal to $\phi c$.

The remaining features of the alternative embodiment may be the same as the embodiment shown in and described with reference to FIGS. 1 and 2. Specifically, the collision ratio calculator 42 may be adapted to calculate the collision ratio, ci(t), in a fashion similar to the collision ratio calculator 22. The phase calculator 41 may be adapted to calculate the phase response function, $R(\Delta\theta ij(t))$, in a fashion similar to the phase calculator 21. Furthermore, the stored stress calculator 43 and the stress response function value calculator or generator 44 may be adapted for calculating the stored stress value, Si(t), and the stress response function value, $\xi(Si(t))$, respectively, in a fashion similar to the stored stress calculator 23 and the stress response function value calculator 24, FIG. 2.

According to the instant alternative embodiment, in a telecommunications network without being provided with a centralized control node, the nodes involved are interactive with neighboring nodes thereof through the transmission and reception of continuous phase signals therebetween to allot time slots under local self-control to establish transmission, as with the embodiment shown in FIGS. 1 and 2.

The alternative embodiment can effectively avoid the circumstance where some node fails to obtain a time slot having its duration at least required for transmitting data to substantially transmit data, thus improving the stability and transmission efficiency in transmitting data between nodes.

Now, reference will be made to FIG. 8, which depicts another alternative embodiment of the invention, in which the transmission timing calculator 12a has a phase response function characteristic determining subsection or determiner 125 interconnected as illustrated. The transmission timing calculator 12a may advantageously be applicable to the node 10 shown in FIG. 1. In those figures, like components are designated with the same reference numerals, and redundant description thereon will be omitted for simplicity.

More specifically, the transmission timing calculator 12a may be the same in structure as the transmission timing calculator 12 shown in FIG. 2, except that the timing calculator 12a comprises the phase response function characteristic determiner 125, which has its input port 61 interconnected to the output, ci(t), from the collision ratio calculator 22 and its output port interconnected to another input port 62 to the phase calculator 21.

The expression (1) is an equation, as stated above, defining the rule, i.e. time development rule, of being in response to the received impulse signal Spr11 to temporally change the rhythm of nonlinear oscillation of the node of interest i. The received impulse signal Spr11 corresponds to the output impulse signal Sout11 transmitted by a neighboring node. The operation of the nodes based upon the expression (1) causes phase differences to be established which are stable between the neighboring nodes. With the instant alternative embodiment, the characteristic of the phase response function, $R(\Delta\theta ij(t))$, is variable in response to a change in collision ratio, ci(t). The phase response function characteristic determiner 125 is adapted for responding to a change in the collision ratio, ci(t), to change the characteristic of the phase response function, $R(\Delta\theta ij(t))$. This may be accomplished by executing the expression (14) defined below.

The phase response function, $R(\Delta\theta ij(t))$, may be exemplified by the expressions (13-1) through (13-4) and (14) indicated below.

The expressions (13-1) through (13-4) and (14) define the phase response function, $R(\Delta\theta ij(t))$, which causes a phase difference to be uniform between the neighboring nodes. In those expressions, p is a constant parameter defining a uniform or equalized phase difference. Such a uniform phase difference is determined so as to be the phase width, $2\pi/p$, corresponding to the time segment resultant from dividing one period by the value, p. The appropriate value of p is dependent upon, e.g. the condition under which the nodes are located in a space, and therefore selected by experiment. The phase width, $2\pi/p$, takes its value equal to or more than the phase width, $\phi c$, required at minimum for transmitting data, namely $2\pi/p >= \phi c$. The parameters, a and b, are constants, of which the values are experimentally fixed.

Figure 9A:
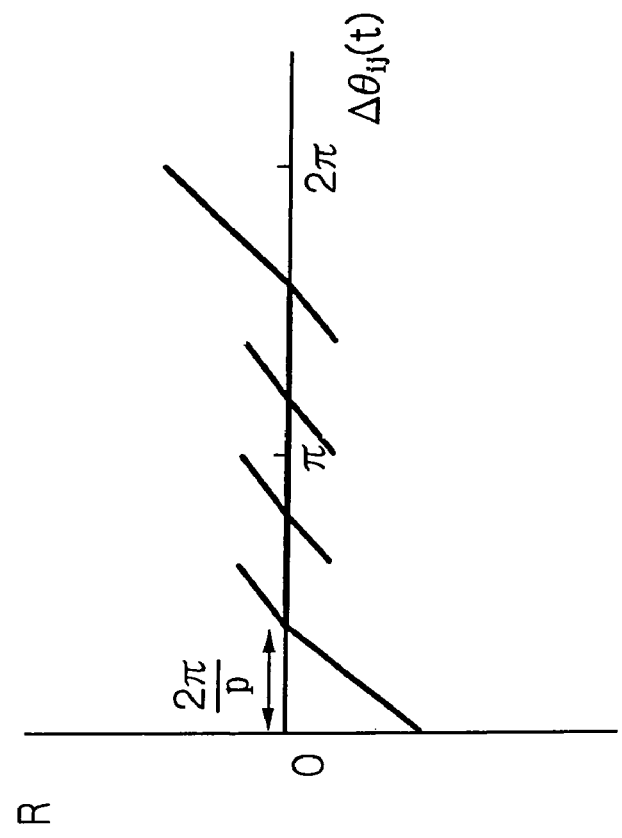
FIGS. 9A and 9B exemplarily plot the phase response function employed by the transmission timing calculator included in the alternative embodiment illustrated in FIG. 8.
Figure 9B:
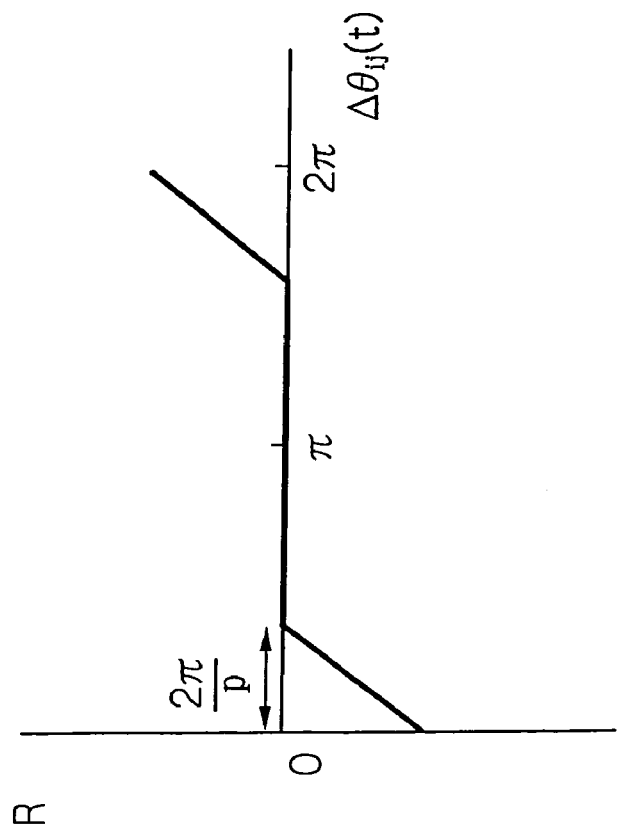

FIGS. 9A and 9B plot the characteristics of the function defined by the expressions (13-1) through (13-4) and (14) where the number of segments, or divisor, p, is five. FIGS. 5A and 5B demonstrate the cases in which the value of the collision ratio, ci(t), is larger, i.e. ci(t)≈1, and smaller, i.e. ci(t)≈0, respectively. When the collision ratio, ci(t), becomes smaller from unity to zero, the function characteristic correspondingly varies from the state shown in FIG. 9A to the state shown in FIG. 9B.

FIG. 9A presents the dynamic characteristic changing, when the relative phase difference, E, stated above is equal to or less than $2\pi/p$, the phase of the node of interest with respect to the neighboring nodes in the direction effecting a repulsion force. In other words, the dynamic characteristic functions to raise the relative phase difference, E, of the node of interest with respect to the neighboring nodes above the value equal to $2\pi/p$.

By contrast, FIG. 9B presents the dynamic characteristic changing the phase difference of the node of interest with respect to the neighboring nodes toward an integral multiple of $2\pi/p$. The provision of that characteristic serves as making even, or equalizing, the distribution of phase differences between the node of interest and the neighboring nodes.

In operation, when the respective nodes start the operation thereof in accordance with the expression (1), they follow the $$R(\Delta\theta ij(t)) = \begin{cases} \alpha \cdot \left(\Delta\theta ij(t) - \frac{2\pi}{p}\right) & \Delta\theta ij(t) \leq \frac{2\pi}{p} & (13\text{-}1) \\ \beta(ci(t)) \cdot \Delta\tilde{\theta}ij(t) & \frac{2\pi}{p} < \Delta\theta ij(t) < 2\pi - p \text{ and } \Delta\tilde{\theta}ij(t) < \frac{\pi}{p} & (13\text{-}2) \\ \beta(ci(t)) \cdot \left(\Delta\tilde{\theta}ij(t) - \frac{2\pi}{p}\right) & \frac{2\pi}{p} < \Delta\theta ij(t) < 2\pi - p \text{ and } \Delta\tilde{\theta}ij(t) > \frac{\pi}{p} & (13\text{-}3) \\ \alpha \cdot \left(\Delta\theta ij(t) - \frac{(p-1)\pi}{p}\right) & 2\pi - \frac{2\pi}{p} \leq \Delta\theta ij(t) & (13\text{-}4) \end{cases}$$

where $$\beta(ci(T)) = b \cdot (1 - ci(t))^2 \qquad (14)$$

and $\Delta\theta ij(t)$ represents the operation of $$\Delta\theta ij(t)\left(\text{mod}\frac{2\pi}{p}\right),$$

which is the remainder from dividing $\Delta\theta ij(t)$ by $2\pi/p$.

characteristic plotted in FIG. 9A due to the larger value the collision ratio, ci(t), takes initially. This results in reducing the nodes taking the relative phase difference, E, from the neighboring nodes equal to or smaller than $2\pi/p$, thus correspondingly decreasing the value of the collision ratio, ci(t) In that condition, however, the distribution of the phase differences between the node of interest and the neighboring nodes has not yet been equalized.

When the collision ratio, ci(t), continues to decrease, the function characteristic shifts itself from the state shown in FIG. 9A to the state shown in FIG. 9B so that the dynamic characteristic becomes functioning to equalize the distribution of the phase difference of the node of interest against the neighboring nodes. Finally, the distribution of the phase difference will converge to the value almost equal to an integral multiple of 2π/p. That causes the distribution of the phase differences to be almost equalized. That operation stated above will substantially equalize the duration of time slots acquired among the neighboring nodes. The remaining operation is substantially the same as the illustrative embodiment shown in and described with reference to FIGS. 1 through 5.

The phase response function, R(Δθij(t)), is not restricted to the function exemplified above. A variety of functions may be applicable which can change the relative phase difference of the node of interest from the neighboring nodes in accordance with the value of the collision ratio, ci(t).

The alternative embodiment described above, in addition to the advantages described in connection with the other embodiments, thus makes it possible to substantially equalize the duration of the time slots acquired among neighboring nodes.

Figure 10:
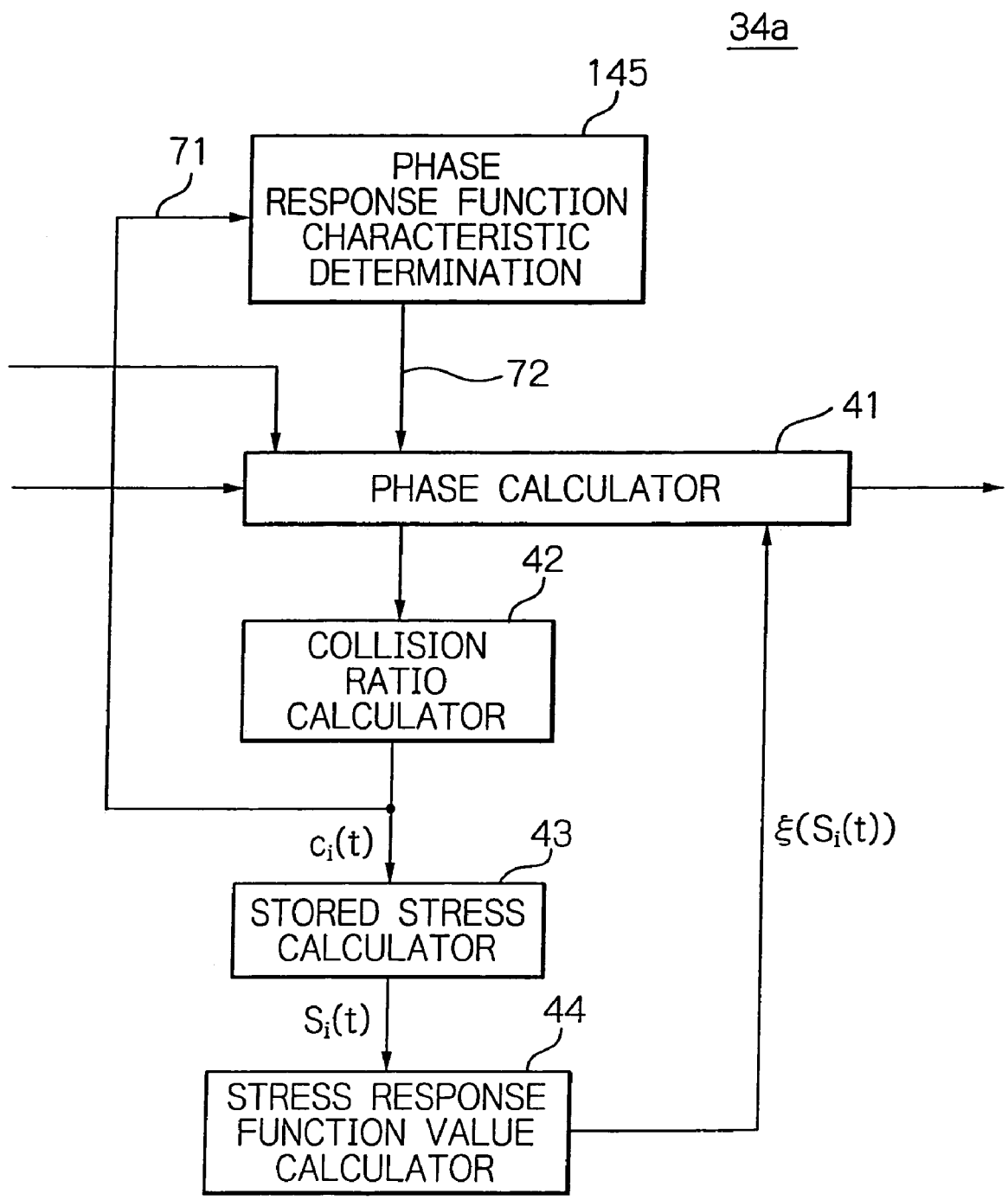
FIG. 10 shows, similarly to FIG. 7, a still further embodiment of the transmission timing calculator applicable to the embodiment shown in FIG. 6.

Now, referring to FIG. 10, a still alternative embodiment will be described. FIG. 10 illustrates the still alternative embodiment, which includes a transmission timing calculator 34a comprising the phase calculator 41, the collision ratio calculator 42, the stored stress calculator 43 and the stress response function value calculator 44, which are interconnected as depicted in the figure. The transmission timing calculator 34a may advantageously be applicable to the node 30 shown in FIG. 6. In addition, the transmission timing calculator 34a further includes a phase response function characteristic determiner 145.

More specifically, the transmission timing calculator 34a may be identical in configuration to the transmission timing calculator 34, FIG. 7, except for comprising the phase response function characteristic determiner 145. As shown in the figure, the phase response function characteristic determiner 145 has its input port 71 interconnected to the output, ci(t), from the collision ratio calculator 42 and its output port interconnected to another input port 72 to the phase calculator 41.

With the instant alternative embodiment shown in FIG. 10 also, the phase response characteristic determiner 145 is adapted to respond to a change in the collision ratio, ci(t), to shift the characteristic of the phase response function, R(Δθij (t)). A specific example of the phase response function, R(Δθij(t)), changing in response to a change in the collision ratio, ci(t), may be given by the expressions (13-1) through (13-4) and (14) defined earlier.

In operation, when the respective nodes start the operation thereof in accordance with the expression (12), they follow the characteristic plotted in FIG. 9A due to the larger value which the collision ratio, ci(t), takes initially. This results in reducing the nodes taking the phase difference from the neighboring nodes equal to or smaller than 2π/p, thus correspondingly decreasing the value of the collision ratio, ci(t). In that condition, however, the distribution of the phase differences between the node of interest and the neighboring nodes has not yet been equalized.

When the collision ratio, ci(t), continues to decrease, the function characteristic shifts itself from the state shown in FIG. 9A to the state shown in FIG. 9B, as with the embodiment shown in FIG. 8, so that the dynamic characteristic becomes functioning to equalize the distribution of the phase difference of the node of interest with respect to the neighboring nodes. That causes the distribution of the phase differences to converge to a value almost equal to an integral multiple of 2π/p.

That operation described above substantially equalizes the duration of time slots acquired among the neighboring nodes. The remaining operation is essentially the same as the illustrative embodiment shown in and described with reference to FIG. 8.

The alternative embodiments shown in and described with reference to FIGS. 8 through 10 are directed to the specific form of phase response function, R(Δθij(t)). The present invention is not restricted to the specific form but may be applicable to other forms of phase response function capable of implementing the invention.

The embodiments shown in FIGS. 8 through 10 are adapted to deduce the value of a stress response function from the collision ratio, ci(t), with respect to the phase, Δθij(t), and change or switch the characteristic of the phase response function, R(Δθij(t)) The system may instead be adapted to switch the characteristic of the phase response function, R(Δθij(t)), alone.

Other alternative embodiments or modifications will be described by way of example. The embodiment shown in FIGS. 1 and 2 works on the basis of the differential equation (1) for the calculation processed by the transmission timing calculator 12. That differential equation is however a mere example of calculating a transmission timing. The differential equation may be replaced with a difference equation, i.e. recurrence equation, into which the differential equation is deformed by differencing, i.e. making the variable, t, discrete.

$$\theta i(u+1) = \theta i(u) + \left[\omega i + \sum_{j=1}^{N} Pj(u) \cdot R(\Delta\theta ij(u)) + \xi(Si(u))\right] \cdot \Delta t \quad (15)$$

where u=0,1,2 ..., and Δt is the duration of a time segment.

In the expression (15), the variable, u, is representative of the period of time of a discrete time segment and takes a value of positive integer. The remaining symbols in the expression are the same as the embodiment shown in and described with reference to FIGS. 1 and 2, noticeably except that all those symbols are functions dependent upon the discrete time variable, u. The variable, Δt represents the duration of a time segment. The continuous time variable, t, and the discrete time variable, u, satisfy the condition, t=u·Δt. The expression (15) means that the value of the phase, θi(u), at the time, u, is used to conduct the value of the phase, θi(u+1), at the following time, u+1.

The way of describing the equation stated above is based upon making the temporal development of the phase, θi(t), discrete on a time axis, i.e. quantization. In addition to the quantization of the temporal development, the status variable may be made discrete. Specifically, the way of description may be applicable in which the value of the phase, θi(t), proper is made discrete, or quantized. In that case, the phase, θi(t), takes one of a plurality (M) of discrete values, M being a natural number. This maybe accomplished by means of the expression (16), for example.

$$\theta i(u+1) = \theta i(u) + quan \quad (16)$$

$$\left(\left[\omega i + \sum_{j=1}^{N} Pj(u) \cdot R(\Delta\theta ij(u)) + \xi(Si(u))\right] \cdot \Delta t\right)$$

where u=0,1,2 ..., and Δt is the duration of a time segment. In the expression (16), the function, quan(*), operates to divide the variable, *, by the quantization step, w, with a digit or digits under the decimal point, or fraction, neglected. The quantization step, w, is equal to the value resultant from dividing the dynamic range of the variable, *, by the positive integer, M, the dynamic range being a range in which the variable, *, can take its value. In the expression (16), the phase, θi(u), takes a quantized phase value at the discrete time, u.

Figure 6:
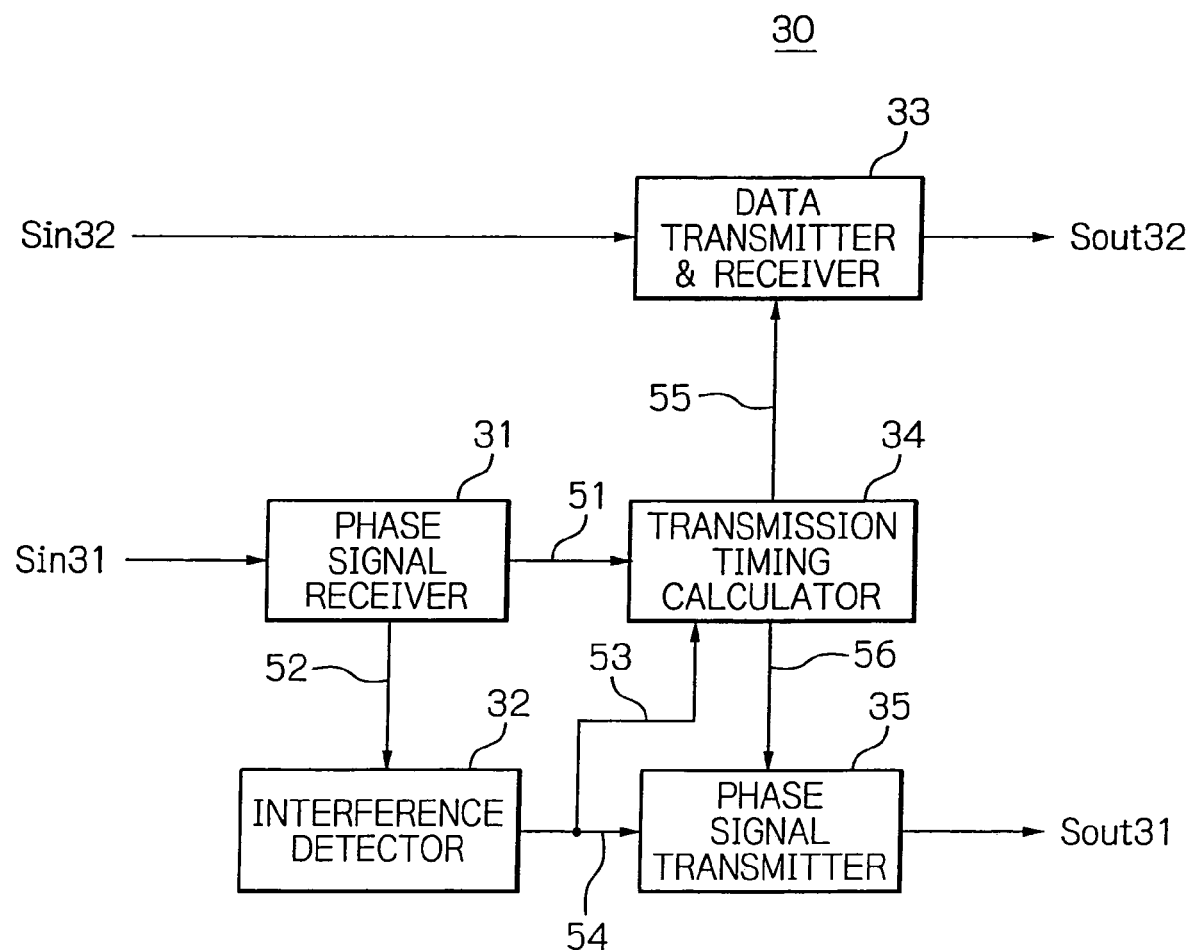
FIG. 6 show, similarly to FIG. 1, an alternative embodiment of apparatus included in a communication node in accordance with the invention.

In a similar way, the expression (12) referred to in connection with the alternative embodiment shown in FIGS. 6 and 7, may accept the differencing or quantizing way of description stated above. Such operation may be implemented in the form of software installed on communication nodes.

The illustrative embodiments described above employ the formulae modeling the nonlinear oscillation exemplified by the expressions (1) and (12), along with the possibility of various modifications. The present invention is however not restricted to those exemplified ways of description of modeling the nonlinear oscillation. For example, M. Toda, et al., "Nonlinear Dynamics" published by Kyoritsu Shuppan Co., Ltd., Tokyo, Japan teaches the van der Pol equation as a general background knowledge. The models of general nonlinear or chaos oscillation such as the van der Pol equation may be applicable. That is of course the case with the interaction between nodes being either discrete, i.e. pulsated, or continuous with respect to time. The operation based upon the van der Pol equation may be implemented in the form of hardware including electronics mounted on communication nodes. Also, general numerical operations such as the Runge-Kutta method may be applicable in the form of software installed on nodes.

The present invention is not dependent upon the time or the operative states, or how to describe specific models, defining specific oscillation phenomena, such as discrete or continuous models of interaction, etc., but may be implemented by means of a variety of models whose operative state transfers in accordance with a specific time development rule. Models having the operative state changing periodically or in a chaotic manner are considered as implementations of the invention.

The illustrative embodiment shown in FIG. 1 is directed to a system having a plurality of communication nodes spatially located in an area to transmit data therebetween in a wireless way, such as radio transmission. The invention is not limited to such a specific wireless communications application, but applicable to a system having communication nodes located in a space and interconnected with solid transmission lines. Specifically, the invention is applicable to a wired local area network (LAN), such as Ethernet (trade name) network. Similarly, the invention may also be applied to a composite network system including various kinds of communication nodes, such as sensors, actuators or servers, interconnected by solid lines, such as metallic or optical fiber lines. The invention may of course be applied to a system having both wired and wireless networks interconnected.

The present invention is utilized as a communication protocol for transmitting data of a routing table between routers on the Internet at different timings. Routers are in this context interpreted as transfer devices having a transmission route selector function of discriminating the destinations of streams of information conveyed over the Internet to select a route for transmission. Routing tables define the rule of selecting a transmission route and are referenced when discriminating the destination of a stream of information. In order to achieve effective transmission, it is necessary for the data of routing tables to be updated whenever changes are involved in the networks or local traffics. For that aim, a lot of routers existing on the networks periodically transfer data of the routing tables therebetween. As taught as a general background knowledge in Floyd. S., et al., "The Synchronization of Periodic Routing Messages", IEEE/ACM Transactions on Networking, Vol. 2, No. 2, pp. 122-136, April 1994, notwithstanding the routers transmitting data of routing tables independently of each other, the phenomenon occurs in which the transmissions from those routers progressively become synchronous or collide therewith. Floyd, et al., proposes a measure in which the transmission protocols for use in transmitting data of routing tables provide the nodes with the processing intervals varied at random, for solving the difficulty to a certain extent. The measure proposed by Floyd, et al., is essentially based merely upon focusing the randomness, thus the improvement being restrictive.

The present invention is as described above applicable to solving the difficulties in collision or synchronization of transmitting data incurred in any types of networks, wireless or wired, to establish communication protocols accomplishing effective data transmission with improved adaptivity and stability.

One of the characteristic features of the invention is directed to the control of obtaining information on the timing of transmitting data, e.g. the phase signal of the embodiments, without depending upon how to utilize such timing information for transmitting data. For example, in a system where the frequencies at which the communication nodes transmit data signals are different from each other, the system may be adapted to transmit data without setting time slots, and even such a system may be adapted to start transmitting data in dependence upon the timing information on transmitting data.

A prior European patent application, EP 1 521 407 A2, assigned to the same assignee as the present patent application discloses many embodiments, to some of which the present invention may be applied.

As has been described in detail, in accordance with the present invention, in a communication network without being provided with a centralized control node, the nodes involved are interactive with neighboring nodes thereof through the transmission and reception of state variable signals therebetween to allot time slots under local self-control to establish transmission.

Additionally, according to the invention, the circumstance can effectively be avoided in which some node fails to obtain a time slot having its duration at least required for transmitting data to substantially transmit data, thus improving the stability and transmission efficiency in transmitting data between nodes.

Further in accordance with the invention, it is possible to substantially equalize the duration of time slots available among neighboring nodes.

The entire disclosure of Japanese patent application Nos. 2004-25756 and 2004-257567 both filed on Sep. 3, 2004, including the specifications, claims, accompanying drawings and abstracts of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. Communication control apparatus to be included in a communication node forming a telecommunications network, comprising a transmission timing calculator responsive to a state of a phase changing in an own node for determining a first timing at which the own node transmits data, wherein said transmission timing calculator comprises:

a phase calculator operative in response to receiving a state variable signal, transmitted by a neighboring node and affected by a phase representative of a second timing at which the neighboring node transmits data, for changing a state of a phase of the own node in accordance with a time development rule;

a collision ratio calculator for monitoring a phase difference of the own node with respect to the neighboring node, and operative in response to the phase difference for calculating a ratio of collision on the first and second timings; and a stress response function value generator for storing time-serially a stress value corresponding to the ratio of collision, and operative in response to the stored stress value for causing the time development rule to provide a phase shift with a value of the phase shift made at random and wherein the time development rule defines a phase response function having a dynamic characteristic changing, when a relative phase difference between the own and neighboring nodes does not exceed a phase width required for avoiding collision, the phase of the own node with respect to the phase of the neighboring node in a direction effecting a repulsion force.

2. Communication control apparatus to be included in a communication node forming a telecommunications network, comprising a transmission timing calculator responsive to a state of a phase changing in an own node for determining a first timing at which the own node transmits data, wherein said transmission timing calculator comprises:

a phase calculator operative in response to receiving a state variable signal, transmitted by a neighboring node and affected by a phase representative of a second timing at which the neighboring node transmits data, for changing a state of a phase of the own node in accordance with a time development rule;

a collision ratio calculator for monitoring a phase difference of the own node with respect to the neighboring node, and operative in response to the phase difference for calculating a ratio of collision on the first and second timings; and a stress response function value generator for storing time-serially a stress value corresponding to the ratio of collision, and operative in response to the stored stress value for causing the time development rule to provide a phase shift with a value of the phase shift made at random and wherein said collision ratio calculator monitors an amount of collision accumulated in a predetermined period of time, the ratio of collision being equal to a value resultant from normalizing the accumulated amount of collision with a maximum accumulated amount of collision.

3. The apparatus in accordance with claim 2, wherein the period of time continues from a previous time at which the phase shift was performed with the value of the phase shift made at random to a present time.

4. Communication control apparatus to be included in a communication node forming a telecommunications network, comprising a transmission timing calculator responsive to a state of a phase changing in an own node for determining a first timing at which the own node transmits data, wherein said transmission timing calculator comprises:

a phase calculator operative in response to receiving a state variable signal, transmitted by a neighboring node and affected by a phase representative of a second timing at which the neighboring node transmits data, for changing a state of a phase of the own node in accordance with a time development rule;

a collision ratio calculator for monitoring a phase difference of the own node with respect to the neighboring node, and operative in response to the phase difference for calculating a ratio of collision on the first and second timings; and a stress response function value generator for storing time-serially a stress value corresponding to the ratio of collision, and operative in response to the stored stress value for causing the time development rule to provide a phase shift with a value of the phase shift made at random wherein said stress response function value generator calculates the stress value on a basis of a function having a characteristic increasing a value as the ratio of collision increases.

5. Communication control apparatus to be included in a communication node forming a telecommunications network, comprising a transmission timing calculator responsive to a state of a phase changing in an own node for determining a first timing at which the own node transmits data, wherein said transmission timing calculator comprises:

a phase calculator operative in response to receiving a state variable signal, transmitted by a neighboring node and affected by a phase representative of a second timing at which the neighboring node transmits data, for changing a state of a phase of the own node in accordance with a time development rule;

a collision ratio calculator for monitoring a phase difference of the own node with respect to the neighboring node, and operative in response to the phase difference for calculating a ratio of collision on the first and second timings; and a stress response function value generator for storing time-serially a stress value corresponding to the ratio of collision, and operative in response to the stored stress value for causing the time development rule to provide a phase shift with a value of the phase shift made at random wherein said stress response function value generator evaluates the stored stress value at a predetermined time interval to produce an evaluated value, and causes the time development to provide the phase shift at a probability based upon the evaluated value.

6. Communication control apparatus to be included in a communication node forming a telecommunications network, comprising a transmission timing calculator responsive to a state of a phase changing in an own node for determining a first timing at which the own node transmits data, wherein said transmission timing calculator comprises:

a phase calculator operative in response to receiving a state variable signal, transmitted by a neighboring node and affected by a phase representative of a second timing at which the neighboring node transmits data, for changing a state of a phase of the own node in accordance with a time development rule;

a collision ratio calculator for monitoring a phase difference of the own node with respect to the neighboring node, and operative in response to the phase difference for calculating a ratio of collision on the first and second timings;

a stress response function value generator for storing time-serially a stress value corresponding to the ratio of collision, and operative in response to the stored stress value for causing the time development rule to provide a phase shift with a value of the phase shift made at random; and an impulse signal transmitter and receiver for transmitting a first impulse signal serving as the state variable signal at a discrete fashion at a timing dependent upon the phase of the own node, and for receiving a second impulse signal transmitted by the neighboring node to cause the phase of the neighboring node to be available to said phase calculator.

7. Communication control apparatus to be included in a communication node forming a telecommunications network, comprising a transmission timing calculator responsive to a state of a phase changing in an own node for determining a first timing at which the own node transmits data, wherein said transmission timing calculator comprises:

a phase calculator operative in response to receiving a state variable signal, transmitted by a neighboring node and affected by a phase representative of a second timing at which the neighboring node transmits data, for changing a state of a phase of the own node in accordance with a time development rule;

a collision ratio calculator for monitoring a phase difference of the own node with respect to the neighboring node, and operative in response to the phase difference for calculating a ratio of collision on the first and second timings;

a stress response function value generator for storing time-serially a stress value corresponding to the ratio of collision, and operative in response to the stored stress value for causing the time development rule to provide a phase shift with a value of the phase shift made at random; and a phase signal transmitter and receiver for consecutively transmitting a continuous phase signal serving as a phase variable signal affected by the phase of the own node, and for receiving a phase signal transmitted by the neighboring node to cause the phase of the neighboring node to be available to said phase calculator.

8. The apparatus in accordance with claim 7, wherein the phase signal is transmitted in a first frequency band different from a second frequency band in which a data signal is transmitted, the first frequency band comprising a plurality of frequency subbands, said apparatus further comprising an arbitrator for performing an initial operation of transmitting and receiving the phase signal to and from the neighboring node to arbitrate the frequency subbands available to the own and neighboring nodes.

9. Communication control apparatus to be included in a communication node forming a telecommunications network, comprising a transmission timing calculator responsive to a state of a phase changing in an own node for determining a first timing at which the own node transmits data, wherein said transmission timing calculator comprises:

a phase calculator operative in response to receiving a state variable signal, transmitted by a neighboring node and affected by a phase representative of a second timing at which the neighboring node transmits data, for changing a state of a phase of the own node in accordance with a time development rule based upon a phase response function;

a collision ratio calculator for monitoring a phase difference of the own node with respect to the neighboring node, and operative in response to the phase difference for calculating a ratio of collision on the first and second timings; and a phase response function characteristic determiner operative in response to the ratio of collision for changing a characteristic of the phase response function wherein said phase response function characteristic determiner provides, when the ratio of collision is larger, the phase response function with a characteristic appropriate for reducing the ratio of collision, and changes the characteristic appropriately for equalizing a distribution of a phase difference as a value of the ratio of collision gets smaller.

10. The apparatus in accordance with claim 9, wherein said phase response function characteristic determiner adjusts the phase difference equally to a predetermined phase width, the predetermined phase width corresponding to a duration of one of a plurality of time segments into which one period is equally divided, said phase response function characteristic determiner having a dynamic characteristic of changing, when the value of the ratio of collision where a relative phase difference does not exceed the predetermined phase width is larger, a phase of the own node with respect to a phase of the neighboring node in a direction effecting a repulsion force, said phase response function characteristic determiner changing, as the ratio of collision gets smaller, the characteristic of the phase response function to a dynamic characteristic of bringing the phase difference close to an integral multiple of the predetermined phase width.

11. Communication control apparatus to be included in a communication node forming a telecommunications network, comprising a transmission timing calculator responsive to a state of a phase changing in an own node for determining a first timing at which the own node transmits data, wherein said transmission timing calculator comprises:

a phase calculator operative in response to receiving a state variable signal, transmitted by a neighboring node and affected by a phase representative of a second timing at which the neighboring node transmits data, for changing a state of a phase of the own node in accordance with a time development rule based upon a phase response function;

a collision ratio calculator for monitoring a phase difference of the own node with respect to the neighboring node, and operative in response to the phase difference for calculating a ratio of collision on the first and second timings; and a phase response function characteristic determiner operative in response to the ratio of collision for changing a characteristic of the phase response function, and wherein said transmission timing calculator further comprises a stress response function value generator for storing time-serially a stress value corresponding to the ratio of collision, and operative in response to the stored stress value for causing the time development rule to provide a phase shift with a value of the phase shift made at random.

12. The apparatus in accordance with claim 11, wherein said stress response function value generator and said phase response function characteristic determiner are operative, when the value of the ratio of collision is smaller, by providing the phase response function with a characteristic appropriate for reducing the ratio of collision, and cause, in response to the stored stress value, the time development rule to provide a phase shift with a value of the phase shift made at random, said stress response function value generator and said phase response function characteristic determiner working the phase response function operative, as the ratio of collision gets smaller, by changing the characteristic appropriately for equalizing a distribution of a phase difference.

\* \* \* \* \*